US012783809B2

(12) United States Patent
Zhang et al.

(10) Patent No.: US 12,783,809 B2
(45) Date of Patent: Nov. 3, 2026

(54) PRODUCING CALIBRATED CONFIDENCE ESTIMATES FOR OPEN-ENDED ANSWERS BY GENERATIVE ARTIFICIAL INTELLIGENCE MODELS

(71) Applicant: Microsoft Technology Licensing, LLC, Redmond, WA (US)

(72) Inventors: Shizhuo Zhang, Champaign, IL (US); Xuchao Zhang, Sammamish, WA (US); Chetan Bansal, Seattle, WA (US); Pedro Henrique Bragioni Las-Casas, Belo Horizonte (BR); Rodrigo Lopes Cancado Fonseca, Bothell, WA (US); Saravanakumar Rajmohan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 210 days.

(21) Appl. No.: 18/382,331

(22) Filed: Oct. 20, 2023

(65) Prior Publication Data

US 2025/0077778 A1 Mar. 6, 2025

Related U.S. Application Data

(60) Provisional application No. 63/536,910, filed on Sep. 6, 2023.

(51) Int. Cl.

| | |
|---|---|
| ***G06F 40/40*** | (2020.01) |
| ***G06F 16/38*** | (2019.01) |
| ***G06F 40/30*** | (2020.01) |

(52) U.S. Cl.

CPC .............. *G06F 40/30* (2020.01); *G06F 16/38* (2019.01)

(58) Field of Classification Search

None

See application file for complete search history.

(56) References Cited

U.S. PATENT DOCUMENTS

| | | | | |
|---|---|---|---|---|
| 10,054,329 | B1 * | 8/2018 | Hutz | G08B 25/002 |
| 2013/0325877 | A1 * | 12/2013 | Niazi | G06Q 30/0203 707/736 |
| 2019/0165988 | A1 * | 5/2019 | Wang | H04L 41/065 |

OTHER PUBLICATIONS

Ahmed et al., "Recommending Root-Cause and Mitigation Steps for Cloud Incidents using Large Language Models," arXiv:2301.03797v1, 12 pp. (Jan. 10, 2023).

(Continued)

*Primary Examiner* — Nafiz E Hoque

(74) *Attorney, Agent, or Firm* — Klarquist Sparkman, LLP

(57) ABSTRACT

A confidence estimation tool uses a calibrated confidence mapping model to estimate confidence for a model-generated candidate root cause. The tool uses a generative artificial intelligence ("AI") model to determine, based on a description of a current event, a candidate root cause of the current event. The tool determines a description-based confidence score using the description of the current event and descriptions of a set of relevant historical events in a target domain. The tool also determines a cause-based confidence score using the candidate root cause of the current event and root causes of the set of relevant historical events. Finally, the tool determines a final confidence score using the description-based and cause-based confidence scores. Even if the generative AI model is configured for general-domain applications, by referencing relevant historical events, the tool can accurately estimate confidence for a model-generated candidate root cause within the target domain.

20 Claims, 8 Drawing Sheets

(56) References Cited

OTHER PUBLICATIONS

Azad et al., "Picking Pearl From Seabed: Extracting Artefacts from Noisy Issue Triaging Collaborative Conversations for Hybrid Cloud Services," arXiv:2105.15065v1, 7 pp. (May 31, 2021).
Bansal et al., "DeCaf: Diagnosing and Triaging Performance Issues in Large-Scale Cloud Services," Proc. of 42nd International Conference on Software Engineering: Software Engineering in Practice, pp. 201-210 (May 23, 2020).
Chen et al., "An Empirical Investigation of Incident Triage for Online Service Systems," Proc. of 41st International Conference on Software Engineering: Software Engineering in Practice, pp. 111-120 (May 25, 2019).
Chen et al., "Continuous Incident Triage for Large-Scale Online Service Systems," Proc. of 34th IEEE/ACM International Conference on Automated Software Engineering, pp. 364-375 (Nov. 11, 2019).
Chen et al., "Empowering Practical Root Cause Analysis by Large Language Models for Cloud Incidents," arXiv:2305.15778v1, 15 pp. (May 25, 2023).
Cosmides et al., "Are Humans Good Intuitive Statisticians After All? Rethinking Some Conclusions from the Literature on Judgment Under Uncertainty," Journal of Cognition, vol. 58, Issue 1, 73 pp. (Jan. 1996).
Ji et al., "Survey of Hallucination in Natural Language Generation," Proceedings of ACM Computing Surveys, vol. 55, No. 12, 38 pp. (Mar. 2023).
Jiang et al., "How Can We Know When Language Models Know? On the Calibration of Language Models for Question Answering," Journal of Transactions of the Association for Computational Linguistics, vol. 9, pp. 962-977 (Sep. 2021).
Jiang et al., "How to Mitigate the Incident? An Effective Troubleshooting Guide Recommendation Technique for Online Service Systems," Proc. of the 28th ACM Joint Meeting on European Software Engineering Conference and Symposium on the Foundations of Software Engineering, pp. 1410-1420 (Nov. 8, 2020).
Jin et al., "Assess and Summarize: Improve Outage Understanding with Large Language Models," arXiv:2305.18084v1, 11 pp. (May 29, 2023).
Lin et al., "Teaching Models to Express Their Uncertainty in Words," arXiv:2205.14334v1, pp. 1-19 (May 28, 2022).
Luo et al., "Correlating Events with Time Series for Incident Diagnosis," Proc. of the 20th ACM SIGKDD International Conference on Knowledge Discovery and Data Mining, pp. 1583-1592 (Aug. 24, 2014).
Nair et al., "Learning a Hierarchical Monitoring System for Detecting and Diagnosing Service Issues," Proc. of the 21st ACM SIGKDD International Conference on Knowledge Discovery and Data Mining, pp. 2029-2038 (Aug. 10, 2015).
Wang et al., "Empower Large Language Model to Perform Better on Industrial Domain-Specific Question Answering," arXiv:2305.11541v2, 13 pp. (May 30, 2023).
Zhang et al., "How Language Model Hallucinations Can Snowball," arXiv:2305.13534v1, 13 pp. (May 22, 2023).
Zhao et al., "Automatic Calibration and Error Correction for Large Language Models via Pareto Optimal Self-Supervision," arXiv:2306.16564v1, 18 pp. (Jun. 23, 2023).
Zhou et al., "Navigating the Grey Area: Expressions of Overconfidence and Uncertainty in Language Models," arXiv:2302.13439v1, 17 pp. (Feb. 26, 2023).
Mielke et al., "Reducing Conversational Agents' Overconfidence Through Linguistic Calibration," Trans. Of the Association for Computational Linguistics, vol. 10, pp. 857-872 (Aug. 2022).
Tian et al., "Just Ask for Calibration: Strategies for Eliciting Calibrated Confidence Scores from Language Models Fine-Tuned with Human Feedback," arXiv:2305.14975v2, 10 pp. (Oct. 2023).
Xiong et al., "Can LLMs Express Their Uncertainty? An Empirical Evaluation of Confidence Elicitation in LLMs," arXiv:2306.13063v1, 27 pp. (Jun. 2023).

* cited by examiner

100

600 (example of 530)

700 (example of 540)

PRODUCING CALIBRATED CONFIDENCE ESTIMATES FOR OPEN-ENDED ANSWERS BY GENERATIVE ARTIFICIAL INTELLIGENCE MODELS

RELATED APPLICATION INFORMATION

This application claims the benefit of U.S. Provisional Patent Application No. 63/536,910, filed Sep. 6, 2023, the disclosure of which is hereby incorporated by reference.

BACKGROUND

An engineer, doctor, or other professional may use an analysis system implemented with artificial intelligence ("AI") to assess a root cause for an event. A description of the event is provided to the analysis system, and the analysis system predicts the root cause for the event. One challenge in developing such analysis systems is effectively quantifying the level of confidence associated with a system-generated root cause for an event.

A generative artificial intelligence ("AI") model generates content from a prompt or question. A large language model ("LLM") is a type of generative AI model that can produce natural language text, often using a generative pre-trained transformer ("GPT") platform. In general, an LLM can perform a variety of natural language processing tasks. For example, an LLM can recognize, summarize, predict and generate text or other content based on knowledge gained from training. Typically, an LLM is trained using a massive dataset for general-domain applications. This enables the LLM to generate content for a wide range of topics but can lead to inaccuracies when generating content in a specific domain.

When an LLM "hallucinates," the LLM generates text that is coherent and grammatically correct but factually incorrect or misleading. Hallucinations by the LLM can occur, for example, when the LLM generates content that is not based on accurate information or can be considered fabricated.

LLMs can be used to predict root causes for events. Prior approaches using LLMs for root cause analysis, however, fail to account effectively for historical inaccuracies and hallucinations by the LLMs.

SUMMARY

In summary, the detailed description presents innovations in confidence calibration and estimation for generative artificial intelligence ("AI") models such as large language models ("LLMs"). The innovations enable accurate confidence calibration and estimation for a generative AI model. In particular, in some example implementations, even when a generative AI model is configured for general-domain applications and lacks domain-specific knowledge for a target domain, the innovations can enable accurate confidence calibration and estimation for analysis provided by the generative AI model within the target domain. The innovations include the features covered by the claims.

According to first aspect of the techniques and tools described herein, a confidence estimation tool uses a calibrated confidence mapping model to estimate confidence for a model-generated candidate root cause. The confidence estimation tool receives a description of a current event. Using the description of the current event and a generative AI model such as a generative language model (e.g., an LLM), the confidence estimation tool determines a candidate root cause of the current event. In some example implementations, the candidate root cause of the current event is a textual response from the generative AI model. The confidence estimation tool determines a description-based confidence score based at least in part on the description of the current event and based at least in part on descriptions of a set of relevant historical events in a target domain. In general, for the set of relevant historical events, relevance depends on semantic similarity between the description of the current event and the descriptions of the set of relevant historical events, respectively. The confidence estimation tool also determines a cause-based confidence score based at least in part on the candidate root cause of the current event and based at least in part on root causes of the set of relevant historical events. Finally, the confidence estimation tool uses a confidence mapping model to determine a final confidence score based at least in part on the description-based confidence score and the cause-based confidence score, and outputs the final confidence score. In this way, even if the generative AI model is configured for general-domain applications, by referencing the set of relevant historical events, the confidence estimation tool can accurately estimate confidence for a model-generated candidate root cause within the target domain.

According to a second aspect of the techniques and tools described herein, a confidence estimation tool calibrates a confidence mapping model that can be used to estimate confidence for model-generated candidate root causes. For each of multiple validation events of a validation set as a current event, the confidence estimation tool performs certain operations. The confidence estimation tool receives a description of the current event. Using the description of the current event and a generative AI model such as a generative language model (e.g., an LLM), the confidence estimation tool determines a candidate root cause of the current event. In some example implementations, the candidate root cause of the current event is a textual response from the generative AI model. The confidence estimation tool determines a description-based confidence score based at least in part on the description of the current event and based at least in part on descriptions of a set of relevant historical events in a target domain. In general, for the set of relevant historical events, relevance depends on semantic similarity between the description of the current event and the descriptions of the set of relevant historical events, respectively. The confidence estimation tool also determines a cause-based confidence score based at least in part on the candidate root cause of the current event and based at least in part on root causes of the set of relevant historical events. Finally, the confidence estimation tool calibrates a confidence mapping model according to an optimization objective based at least in part on the description-based confidence scores and the cause-based confidence scores for the validation events, respectively. In this way, even if the generative AI model is configured for general-domain applications, by referencing the set of relevant historical events, the confidence estimation tool can calibrate the confidence mapping model to estimate confidence accurately for a model-generated candidate root cause within the target domain.

The innovations described herein can be implemented as part of a method, as part of a computer system (physical or virtual, as described below) configured to perform the method, or as part of a tangible computer-readable media storing computer-executable instructions for causing one or more processors, when programmed thereby, to perform the method. The various innovations can be used in combination or separately. The innovations described herein include the innovations covered by the claims. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures and illustrates a number of examples. Examples may also be capable of other and different applications, and some details may be modified in various respects all without departing from the spirit and scope of the disclosed innovations.

BRIEF DESCRIPTION OF THE DRAWINGS

The following drawings illustrate some features of the disclosed innovations.

DETAILED DESCRIPTION

Figure 1:
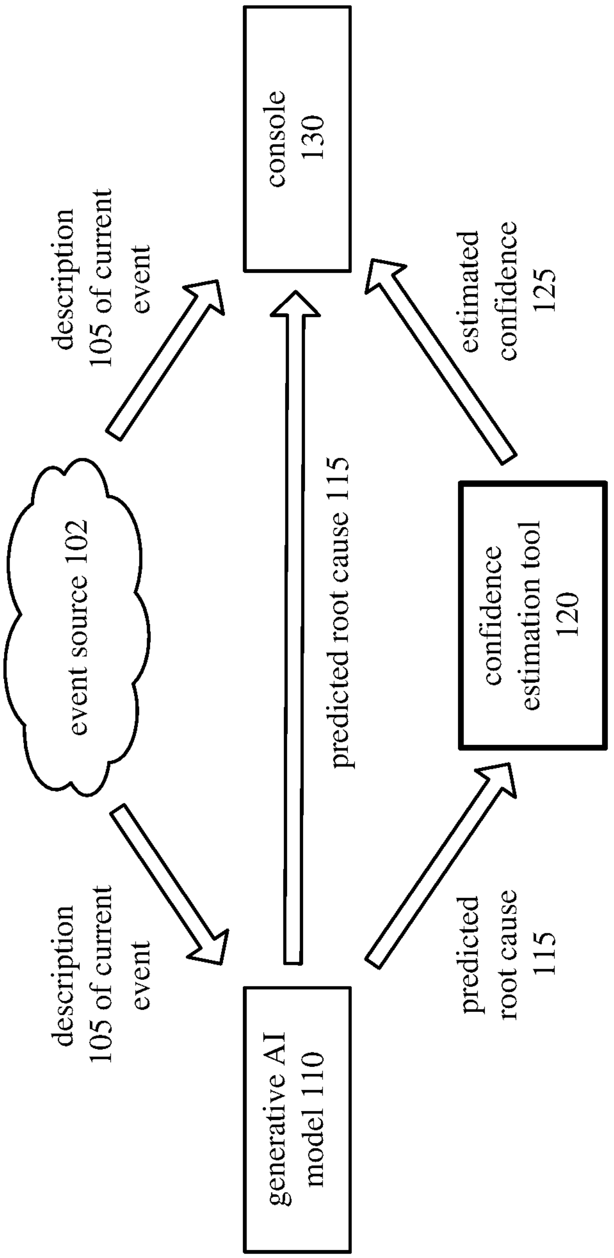
FIG. 1 is a diagram illustrating an example network environment in which some described embodiments can be implemented.

The detailed description presents innovations in confidence calibration and estimation for generative artificial intelligence ("AI") models such as large language models ("LLMs"). The innovations enable accurate confidence calibration and estimation for a generative AI model. In particular, in some example implementations, even when a generative AI model is configured for general-domain applications and lacks domain-specific knowledge for a target domain, the innovations can enable accurate confidence calibration and estimation for analysis provided by the generative AI model within the target domain.

In some of the examples described herein, the generative AI model used in confidence calibration or estimation is an LLM. More generally, the generative AI model can be another type of language model that generates natural language text, or a language model that generates text other than natural language text, or a model that generates images, audio, video, or other content.

In some of the examples described herein, the generative AI model used in confidence calibration or estimation is configured for general-domain applications and lacks domain-specific knowledge for a target domain. Alternatively, the generative AI model has been trained, at least in part, using a dataset for a target domain as well as datasets in one or more other domains, such that the generative AI model has at least some domain-specific knowledge in the target domain as well as domain-specific knowledge in the other domain(s) and/or general-domain knowledge.

In many of the examples described herein, a generative AI model is used for root cause analysis, and a confidence estimation tool is used to calibrate or estimate confidence in candidate root causes, where a root cause of an event is a source of the event or primary factor responsible for the event. More generally, according to approaches described herein, a confidence estimation tool can be used to estimate confidence for any of various types of responses produced by a generative AI model, where the confidence estimation uses a database of historical events (that is, reference events). As such, as the term "root cause" is used herein, rather than always indicating a source of an event or primary factor responsible for the event, the "root cause" of an event can instead be a subsequent effect, prediction associated with the event, or other response associated with a description of the event.

Thus, approaches described herein can be applied to confidence estimation for model-generated responses in various scenarios, where the confidence estimation uses a database of historical events. The database can be any knowledge base that stores historical events, where each historical event in the database has a description of the event and a ground-truth root cause for the event. The ground-truth root cause can be any assessment, analysis, explanation, or other response associated with the description of the event. An event can be any type of incident or condition that has occurred. The description of an event can be any characterizations or observations about the event. Although the term "historical" is used herein, a "historical" event is a reference event that may have occurred before or after the current event in time. Based on the description of an event, a generative AI model generates a candidate root cause of the event. As used herein, the term "candidate root cause" means any response generated by the generative AI model in response to the description of the event. The confidence estimation tool can estimate calibrated confidence levels by conducting chain-of-thought relevance analyses between the database of historical events and new input data.

I. Introduction to Confidence Calibration and Estimation for Generative AI Models.

Techniques and tools described herein address the challenges of confidence calibration and estimation when using a generative AI model such as an LLM for root cause analysis in a domain-specific application. A generative AI model provides powerful capabilities to recognize, summarize, predict and generate text or other content. Typically, however, the generative AI model has been trained for general-domain applications. According to approaches described herein, such a generative AI model can nevertheless be used for root cause analysis in a specific target domain. For example, techniques and tools described herein can be used to generate well-calibrated confidence scores for model-generated root causes in a variety of target domains, such as failures of mechanical systems, medical conditions, data center incidents, and failures of customer devices. More generally, the target domain can be any specific application area in which a user asks questions to the generative AI model, and a confidence score is returned to the user along with an answer from the generative AI model, where the confidence score is determined using relevant historical events in the specific application area.

Approaches described herein can account for a generative AI model's perception of the strength of evidence provided by historical events in a target domain. The model's judgment and its confidence in its own judgment can be taken into consideration when producing a confidence estimate for a root cause generated by the generative AI model. In particular, in some example implementations, the generative AI model can generate text expressing its confidence based on the evidence, and the text can be converted into a well-calibrated score. Unlike approaches that hinge on output probabilities, approaches described herein use model-driven reasoning paths as central determinants for gauging confidence. The generative AI model can generate reliable reasoning paths that act as indicators of confidence for complex tasks.

In some example implementations, a generative AI model generates a candidate root cause based on a description of a current event. The description of the current event indicates symptoms of the current event. The candidate root cause is a possible answer that explains the symptoms. A confidence estimation tool determines a confidence score for the candidate root cause generated by the generative AI model. Confidence estimation includes multiple stages.

In a retrieval augmentation stage, the confidence estimation tool retrieves historical events similar to the current event. The confidence estimation tool retrieves description of the similar historical events along with root causes of the similar historical events. For example, the confidence estimation tool utilizes a pre-trained retrieval model that gauges semantic similarity between the description of the current event and descriptions of available historical events. The retrieval model extracts relevant historical events. The historical events are often earlier in time than the current event but, more generally, are any reference events for the current event. Thus, a "historical" event can be an event later in time than the current event, although a description and root cause of the historical event (as a reference event) are already available for comparison purposes.

In a description-based confidence estimation stage, the confidence estimation tool assesses the confidence of the generative AI model in analyzing a root cause for the current event based on the descriptions of the current event and relevant historical events, without considering the candidate root cause. This stage is a "pre-execution" stage in that the candidate root cause is not considered. The description-based confidence estimation stage can filter out (assign a very low confidence score) a candidate root cause when the description of the current event falls outside the scope of relevant events, making subsequent assessment of the confidence in a candidate root cause unnecessary.

For the description-based confidence estimation stage, the confidence estimation tool can use the generative AI model to generate multiple description analysis paths ("DAPs") that illustrate the inherent connection (here, description coherence) between the current event and the retrieved relevant historical events. Using its logical reasoning and common-sense reasoning capabilities, the generative AI model can establish connections between events based on their underlying causal relationships, rather than solely relying on semantic similarity. For example, in the specific domain of incident management for a data center, a server response timeout incident may relate to (a) a network interruption or (b) running out of physical memory. Both network problems and memory limitations can lead to response timeouts, either through repeated network retries or the need to transfer data from memory to disk.

The confidence estimation tool can then use the generative AI model to score the multiple DAPs. For each of the DAPs, the confidence estimation tool prompts the generative AI model to gauge the level of confidence in associating the current event with the specific DAP, providing one or more scores for the specific DAP. For example, assuming the generative AI model generates $m_1$ DAPs for the current event, the confidence estimation tool prompts the generative AI model to sample $k_1$ scores for each DAP. Subsequently, the confidence estimation tool aggregates the $m_1 \times k_1$ scores across the DAPs (e.g., averaging the scores) to establish a description-based confidence score for the current event. The description-based confidence score effectively captures how the current event's root cause can be inferred from historical events. Moreover, by checking that each DAP is grounded in at least one past event exhibiting similar symptoms or root causes, the confidence estimation tool can help avoid reliance on hallucinated DAPs.

In a cause-based confidence estimation stage, the confidence estimation tool assesses confidence in the candidate root cause. Specifically, the confidence estimation tool assesses the confidence of the generative AI model in analyzing a root cause for the current event based on the descriptions of the current event and relevant historical events, as well as the candidate root cause of the current event and root causes of the relevant historical events. This stage is a "post-execution" stage in that the candidate root cause is considered.

For the cause-based confidence estimation stage, the confidence estimation tool can use the generative AI model to generate multiple cause analysis paths ("CAPs") that illustrate the connection between the description of the current event and the candidate root cause of the current event. Using its logical reasoning and analogical reasoning capabilities, the generative AI model can validate the relationship between the description of the current event and candidate root cause, deducing the root cause based on similar event descriptions rather than relying solely on semantic similarity. If there is a logical error in a CAP, a lower confidence score can be assigned.

The confidence estimation tool can then use the generative AI model to score the multiple CAPs. For each of the CAPs, the confidence estimation tool prompts the generative AI model to gauge the level of confidence in the candidate root cause according to the specific CAP, providing one or more scores for the specific CAP. A higher score indicates the generative AI model considers the candidate root cause to be of higher quality. For example, assuming the generative AI model generates $m_2$ CAPs for the current event, the confidence estimation tool prompts the generative AI model to sample $k_2$ scores for each CAP. Subsequently, the confidence estimation tool aggregates the $m_2 \times k_2$ scores across the CAPs (e.g., averaging the scores) to determine a cause-based confidence score for the current event. The cause-based confidence score effectively indicates the quality of the current event's root cause. Moreover, by checking that each CAP is grounded in at least one past event exhibiting similar symptoms and/or root causes, the confidence estimation tool can verify that CAPs are grounded in actual events, so as to prevent the introduction of false information and logical errors.

In a confidence mapping stage, the confidence estimation tool maps the description-based confidence score and cause-based confidence score to a final confidence score. To do so, the confidence estimation tool uses a confidence mapping model. The confidence mapping model is calibrated to find an optimal alignment from the model-derived scores (that is, the description-based confidence score and cause-based confidence score) to the final confidence score.

When an LLM is used to predict root causes for events in a target domain, it can be very difficult to estimate confidence of the model-predicted root causes. In many cases, the LLM is a general-purpose LLM, which lacks domain-specific knowledge in the target domain. In other cases, a model-predicted root cause results from hallucination by the LLM. The model-predicted root cause is grammatically correct and coherent, but upon scrutiny is factually incorrect or misleading. Also, the LLM is often a "black box" that does not expose information (such as factors the LLM has considered or steps the LLM has taken to predict a root cause) that might be used to estimate confidence in the model-predicted root cause.

Approaches described herein provide technical solutions to these technical problems in estimating confidence for model-generated root causes in a target domain. The technical solutions use relevant historical events to guide confidence estimation, which can enable confidence estimation for model-generated root causes in the target domain even when a general-purpose generative AI model has provided the model-generated root causes. Using relevant historical events to guide confidence estimation can also help screen out model-generated root causes that result from hallucination by an LLM. Approaches described herein work for a "black box" generative AI model.

Thus, the approaches described herein provide several technical advantages.

For example, the approaches enable use of a general-purpose generative AI model for root cause analysis in specific target domains. By incorporating relevant historical events into confidence estimation utilizing the generative AI model, well-calibrated confidence scores can be generated for model-generated recommendations (root causes) in specific target domains, and recommendations based on hallucinations can be avoided.

As another example, well-calibrated confidence scores improve the usefulness of model-generated recommendations (root causes). By providing assessments of the plausibility and reliability of the model-generated recommendations, automated diagnosis of events is improved. This can significantly boost the decision-making accuracy and productivity of engineers, doctors, and other professionals using analysis tools, as well as boosting reliability and customer satisfaction.

As another example, according to approaches described herein, a confidence estimation tool is not tied to any given generative AI model. By working with a generative AI model as a "black box," the confidence estimation tool can easily work with different generative AI models, which may have different strengths and weaknesses. Also, the confidence estimation tool can easily work with newly introduced generative AI models that have new features and improvements.

II. Example Network Environment

FIG. 1 shows an example network environment (100) that includes an event source (102), a generative AI model (110), a confidence estimation tool (120), and a console (130) The event source (102), generative AI model (110), confidence estimation tool (120), and console (130) can be connected over the Internet, connected over another network, or connected in some other way.

The generative AI model (110) can be an LLM that implements ChatGPT-3.5, ChatGPT-4, Text-DaVinci-003, or some other type of LLM. Alternatively, the generative AI model (110) can be another type of generative AI model. In some example implementations, the generative AI model (110) is a "black box" to the confidence estimation tool (120). The generative AI model (110) receives a description (105) of a current event. For example, the description (105) of the current event is a description of an incident in a data center, symptoms of a medical condition, symptoms of a failure of a consumer device, or symptoms of another type of failure of a system or device. In FIG. 1, the generative AI model (110) receives the description (105) of the current event from an event source (102), which represents any type of source for a description of the current event. In any case, based on the description (105) of the current event, the generative AI model (110) generates a predicted root cause (115) (also called a candidate root cause) for the current event.

The predicted root cause (115) is provided to a confidence estimation tool (120), which produces an estimated confidence (120) for the predicted root cause (120). The confidence estimation tool (120) can be implemented as described in the following sections.

The console (130) represents a computer system that receives information and presents the information to a decision-maker or automatically makes a decision based on the information. The console (130) receives the model-generated predicted root cause (115) and estimated confidence (125). For reference, the console (130) can also receive the description (105) of the current event.

III. Example Confidence Estimation Tools

Figure 2:
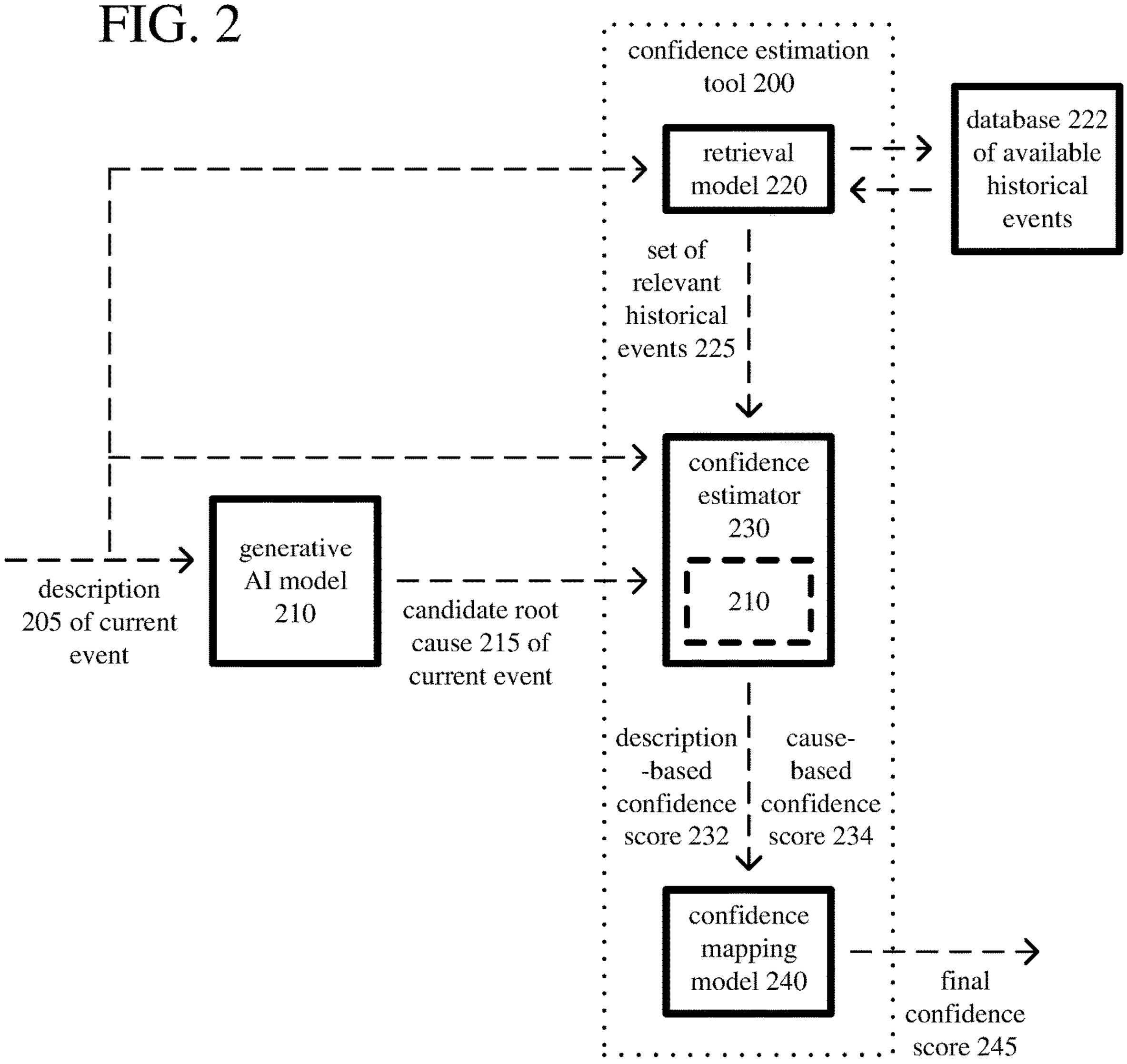
FIG. 2 is a diagram illustrating an example confidence estimation tool.

FIG. 2 shows an example confidence estimation tool (200) that operates in conjunction with a generative AI model (210) and database (222) of available historical events. The generative AI model (210), confidence estimation tool (200), and database (222) can be connected over the Internet, connected over another network, or connected in some other way.

The generative AI model (210) can be an LLM that implements ChatGPT-3.5, ChatGPT-4, Text-DaVinci-003, or some other type of LLM. Alternatively, the generative AI model (210) can be another type of generative AI model. In some example implementations, the generative AI model (210) is a "black box" to the confidence estimation tool (200). The generative AI model (210) receives a description (205) of a current event and generates a candidate root cause (215) of the current event, for evaluation by the confidence estimation tool (200).

The confidence estimation tool (200) includes a retrieval model (220), confidence estimator (230) that interacts with the generative AI model (210), and a confidence mapping model (240), which is configured during a calibration process. The retrieval model (220), confidence estimator (230), and confidence mapping model (240) can be connected over the Internet, connected over another network, or connected in some other way.

The retrieval model (220) receives the description (205) of the current event and extracts a set of relevant historical events (225) from the database (222) of available historical events. In general, to measure relevance, the retrieval model (220) quantifies semantic similarity between the description (205) of the current event and descriptions of the available historical events in the database (222). Among the available historical events in the database (222), events having a threshold semantic similarity (or the top x events by semantic similarity) can be extracted as the set of relevant historical events (225). Example approaches to extracting the set of relevant historical events (225) are described below.

The confidence estimator (230) receives the set of relevant historical events (225) along with the model-generated candidate root cause (215) of the current event and the description (205) of the current event. Using this information, the confidence estimator (230) produces two confidence scores for the model-generated candidate root cause (215) of the current event. The first confidence score is a description-based confidence score (232), which quantifies the extent to which the set of relevant historical events (225) are helpful to explain the current event, as specified in the description (205) of the current event. The second confidence score is a cause-based confidence score (234), which quantifies the quality of the candidate root cause (215) in view of the relevant historical events (225). Example approaches to determining the description-based confidence score (232) and the cause-based confidence score (234) are described below.

The confidence mapping model (240) maps the description-based confidence score (232) and the cause-based confidence score (234) to a final confidence score (245), which the confidence estimation tool (200) outputs. Example approaches to calibrating the confidence mapping model (240) are described below.

IV. Example Implementation

This section describes an example implementation in which a confidence estimation tool, using a general-purpose LLM, produces calibrated confidence scores for LLM-predicted root causes for cloud incidents. The calibrated confidence scores can assist on-call engineers in deciding the extent to trust the LLM-predicted root causes.

Confidence estimation for LLM-predicted root causes presents several challenges. One challenge relates to specification of confidence estimation techniques that are both highly adaptable and broadly applicable. Like other root-cause generators, LLMs may vary across different services due to the unique nature of different services. Moreover, like other root-cause generators, LLMs typically change over time. It is helpful for confidence estimation methods to work regardless of the underlying LLM, which enhances the reliability and versatility of confidence estimation across diverse LLMs and services. In some example implementations, any LLM that produces open-ended textual responses as its candidate root causes can be used as a root cause generator.

Limited access to LLMs presents another challenge. Although LLMs can be highly effective in numerous applications, acquiring details and information about how candidate root causes are generated by the LLMs can be problematic. Details such as weights, probability scores, and logits could be useful for confidence estimation. In practice, acquiring such details from the LLMs can be impractical or impossible. As such, a realistic assumption is to treat an LLM as a black box, with access only to (a) limited information (such as an event description) provided as inputs to the LLM and (b) the candidate root cause $\hat{r}_{query}$ provided as output from the LLM. No assumptions are made about configurations, weights, or output probabilities/logits of the LLM, the algorithm used by the LLM to generate candidate root cause $\hat{r}_{query}$, or any other prompts or auxiliary information used by the LLM.

Given a description $d_{query}$ of a current incident and an LLM-predicted root cause $\hat{r}_{query}$ of the current incident, a confidence estimation tool returns a confidence estimate $\psi$ that reflects the confidence of $\hat{r}_{query}$ being the correct root cause. In some example implementations, the confidence estimation tool remains essentially decoupled from the root cause analysis procedure. In this way, confidence estimation with the confidence estimation tool is versatile and adaptable, working seamlessly with different LLMs while overcoming the limitations of restricted access to the internal workings of certain LLMs.

In some example implementations, the confidence estimation tool uses a retrieval-augmented two-stage procedure to conduct confidence estimation for LLM-generated root causes, leveraging the capabilities of LLMs through prompting. With this retrieval-augmented procedure, the confidence estimation tool provides a robust framework for confidence estimation in cloud incident root causes. The confidence estimation tool leverages the capabilities of LLMs effectively, enabling decision-makers to make informed decisions and troubleshoot cloud-related incidents with increased accuracy and confidence.

A. Retrieval-Augmented Confidence Calibration

Root cause analysis typically has strongly domain-specific characteristics, which complicates confidence estimation. Off-the-shelf LLMs are primarily designed for general-domain applications and lack domain-specific knowledge used for a specific service. On the other hand, relevant historical incidents and their expert-recommended root causes can offer crucial insights into the root cause of a current incident.

To exploit insights from relevant historical incidents, the confidence estimation tool implements a retrieval-augmentation-based pipeline. To prepare retrieval-augmented data, the confidence estimation tool retrieves a list of similar historical incidents relevant to the current incident. This retrieval process is facilitated by employing semantic similarity-based dense retrievers, which enables the confidence estimation tool to identify past incidents with potential connections to the current problem at hand.

In some example implementations, the confidence estimation tool implements dense retrieval as follows. A database $D=\{h_i=(d_i, r_i): i=1, 2, \ldots n_{max}\}$ contains a count $n_{max}$ of historical incidents $h_i$. For example, $n_{max}$ is 5000, 10000, or some other count of historical incidents. A given historical incident $h_i$ is a pair of fields—the description $d_i$ of the historical incident and the ground-truth root cause $r_i$ of the historical incident. The confidence estimation tool computes an embedding $\mathrm{Enc}(d_{query}; \theta_{enc})$ for the description $d_{query}$ of the current incident, where $\theta_{enc}$ represents the parameters of an encoder. For each historical incident in the database (that is, for $d_i \in D$), the confidence estimation tool computes an embedding $\mathrm{Enc}(d_i; \theta_{enc})$ for the description $d_i$ of the historical incident, where $\theta_{enc}$ represents the same parameters of the same encoder, and then computes a similarity score $(\mathrm{Enc}(d_{query}; \theta_{enc}), \mathrm{Enc}(d_i; \theta_{enc}))$, for example, by calculating the inner product of the encoded vectors (embeddings).

For the current incident, the confidence estimation tool retrieves a list of relevant historical incidents from the database D. The list is sorted based on the similarity scores, up to a fixed token budget L to form a set of relevant historical incidents H for the current incident. For example, the confidence estimation tool retrieves the k most relevant historical incidents, where $k=\max(k')$ such that $\mathrm{len}([h_{[1]}, \ldots, h_{[k]}]) \leq L$, and where $h_{[j]}$ is the $j^{th}$ highest ranked incident with respect to $d_{query}$, and len(.) returns the total number of tokens in a list of data instances.

Alternatively, the confidence estimation tool implements dense retrieval in some other way. For example, the confidence estimation tool implements an artificial intelligence similarity search algorithm, as provided in the FAISS library.

Figure 3:
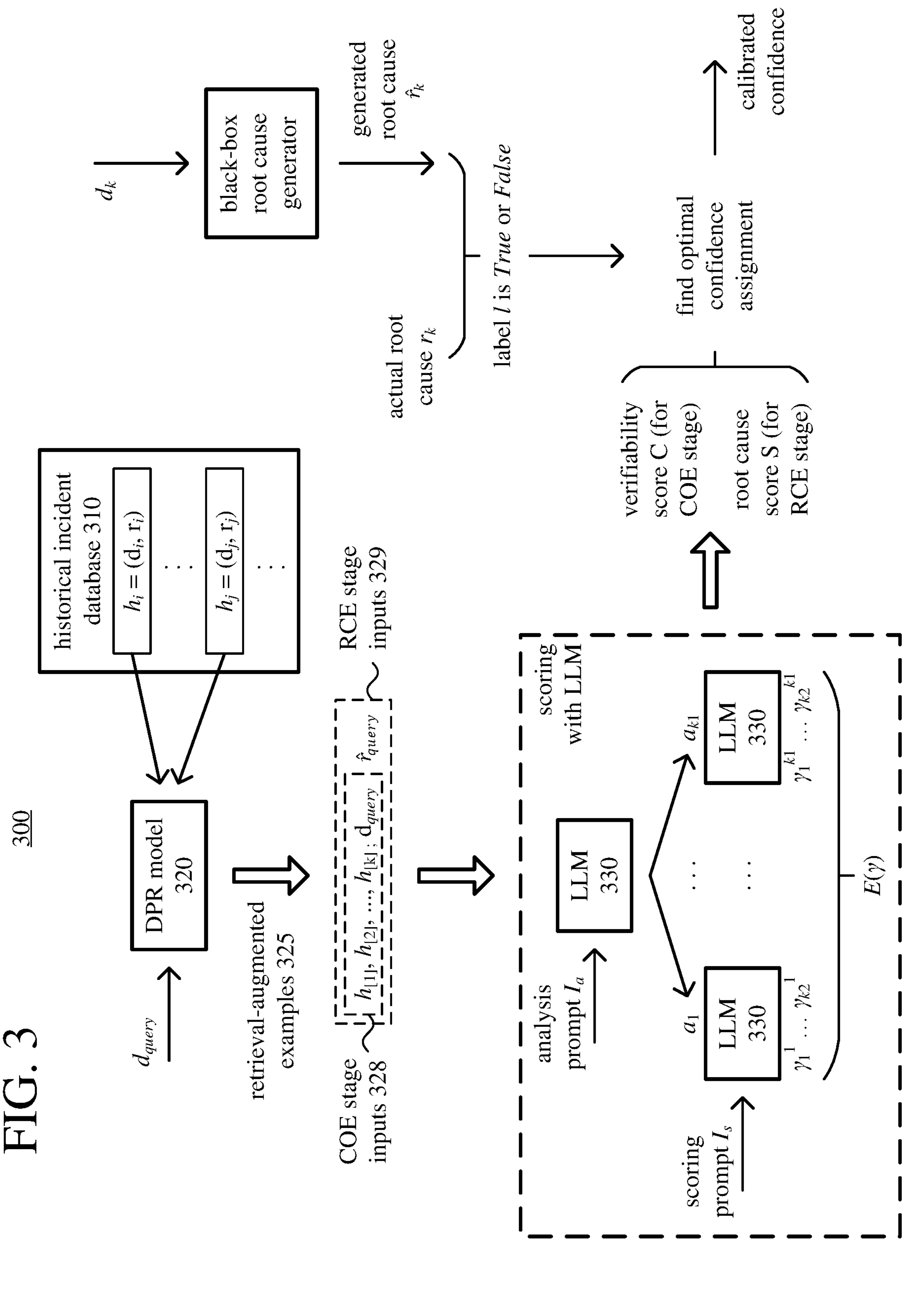
FIG. 3 is a diagram illustrating an example processing flow when calibrating a confidence mapping model according to an example implementation.

FIG. 3 shows an example processing flow (300) when calibrating a confidence mapping model. In the example processing flow (300), a dense retrieval model ("DPR") model (320) of the confidence estimation tool receives a description $d_{query}$ of the current incident and retrieves historical incidents such as $h_i=(d_i, r_i)$ and $h_j=(d_j, r_j)$ from a historical incident database (310).

B. Confidence-of-Evaluation Pre-Examination

Following the retrieval of historical incidents, the confidence estimation tool prompts the LLM to perform confidence-of-evaluation ("COE") pre-examination. During this stage, the LLM is given the relevant historical incidents H including their associated root causes, along with the description $d_{query}$ of the current incident. The LLM is prompted to consider whether it possesses sufficient information to analyze the underlying cause of the current incident.

An LLM's assessment of the candidate root cause for the current incident can rely significantly on historical incidents. Historical incidents retrieved using the semantic similarity-based retriever might encompass a range of situations, however, including some with differing relevance to the current incident. In some cases, retrieved historical incidents might not offer sufficient guidance for the LLM to evaluate the root cause of the current incident effectively. Additionally, the phenomenon of hallucination in LLMs can undermine the reliability of LLM-generated root causes. COE pre-examination accounts for the effect of uninformative or misleading historical incidents in the evaluation of root causes.

For the COE pre-examination, the confidence estimation tool accepts the retrieved historical incidents $H=\{h_1, \ldots h_k\}$. Each $h_i=(d_i, r_i)$ is a pair of historical incident description and its ground-truth root cause. The confidence estimation tool also accepts the description $d_{query}$ of the current incident. With this information, and through prompt-driven interaction with the LLM, the confidence estimation tool determines whether it has enough evidence from H to reason about the root cause of the current incident. In this step, the confidence estimation tool obtains the LLM's level of confidence in its capacity to reason effectively about the root cause of the current incident, given the retrieved historical incidents. If the LLM is low in confidence about determining the root cause due to the lack of information, the LLM-generated root cause may also be less trustworthy.

Concretely, the LLM first generates analysis in textual form, conditioned on the relevant historical incidents H, the description $d_{query}$ of the current incident, and an instruction for analysis $$I_a^{COE}.$$

For example, the instruction for analysis $$I_a^{COE}$$

is:

Prompt listing for $I_\alpha^{COE}$

```
#Instructions
##Task description:
- You are dealing with root cause analysis for a cloud incident. You are an
**on-call engineer** who is responsible for investigating the root cause.
- You will be given a list of historical incidents and corresponding root causes.
Analyze if these incidents are helpful in finding the root cause of the current
incident.
## Answering format:
- Analyze the historical incidents' relevance to the target query **concisely**.
## Hint:
- A historical incident is helpful if the incident descriptions are similar, or the
root cause of the target incident is similar.
>>> Retrieved Historical Incidents:
{ }
>>> Current Incident:
{ }
You should explain if you think the list of historical incidents is helpful. You
should **be brief**
```

In order to reduce biases and cover more facets, the confidence estimation tool samples multiple analyses $$a_j^c$$

for the current incident:

$$a_j^c \sim p(a \mid H, d_{query}, I_a^{COE}), \text{ where } j = 1, 2, \ldots, k_1, \text{ and } k_1$$

is the number of analyses for the current incident. Thus, for j iterations, the confidence estimation tool prompts the LLM to provide analysis based on the relevant historical incidents H, the description $d_{query}$ of the current incident, and the instruction for analysis $$I_a^{COE}.$$

Even when the information provided in the prompt is unchanged, the LLM generates different analysis due to changes in one or more internal conditions of the LLM. For example, a control parameter (such as so-called "temperature") of the LLM controls the level of variation introduced in responses from the LLM, with a value of zero causing the LLM to return the same response in a deterministic way, and with increasing values causing increasing variation in responses returned by the LLM in different samples. By setting a value for the control parameter that is greater than zero, the LLM generates different analysis due to changes in one or more internal conditions of the LLM.

The confidence estimation tool then prompts the LLM to provide scores for the LLM-generated analyses. For example, the confidence estimation tool samples $k_2$ binary responses from the LLM about whether the LLM thinks the historical conditioning is helpful for each analysis. For example, the instruction for scoring $$I_s^{COE}$$

is:

| Prompt listing for $I_s^{COE}$ |
|---|
| #Instructions<br>##Task description:<br>- You are dealing with root cause analysis for a cloud incident. You are an **on-call engineer** who is responsible for investigating the root cause.<br>- You will be given a list of historical incidents and corresponding root causes. Analyze if these incidents are helpful in finding the root cause of the current incident.<br>## Answering format:<br>- If you are asked "how many", you should respond with a number only. E.g., 1,2,3,.... Do not generate any additional text.<br>## Hint:<br>- A historical incident is helpful if the incident descriptions are similar, or you believe the root cause of the target incident is similar.<br>- The previous analysis you did may be right or wrong.<br>Do you think the examples given are helpful in solving the current incident?\nA: Yes\nB: No\n<br>Provide your answer with "A" or "B" below.<br>The first letter of your response should be your choice. I.e., you should start with "A" or "B". You should not respond with a sentence like "I" or "My" or "Based".<br>You have to pick **one** choice. |

For each of the $k_1$ instances of analysis $$a_j^c,$$

the confidence estimation tool samples $k_2$ scores $$c_p^j \sim p(c|H, d_{query}, I_s^{COE}, a_j^c), \text{ where } p = 1, 2, \ldots, k_2, \text{ and } k_2$$

is the number of intermediate scores for the $j^{th}$ analysis $$a_j^c.$$

Thus, for p iterations per analysis $$a_j^c,$$

the confidence estimation tool prompts the LLM to provide a score based on the relevant historical incidents H, the description $d_{query}$ of the current incident, the instruction for scoring $$I_s^{COE}, \text{ and the analysis } a_j^c.$$

Even when the information provided in the prompt is unchanged, the LLM generates different analysis due to changes in one or more internal conditions of the LLM (e.g., when the value of a control parameter for the LLM causes the LLM to generate different responses at different times, even for the same prompt).

In this step, the confidence estimation tool provides the LLM with a multiple-choice question consisting of two options (Yes/No) and asks the LLM to pick one option.

$$c_j^i = IND(\text{choice} == \text{yes}) \in \{0, 1\}.$$

IND (x) is the indicator function (also called the characteristic function) of the set in question, which may be denoted in subscript. IND (x) is 1 if x is a member of the set, and IND (x) is 0 if x is not a member of the set.

The confidence estimation tool then estimates the COE score as the empirical mean across all scores obtained from all analyses:

$$E(c) = \frac{1}{k_1 \times k_2} \sum_{p=1,\ldots k_2} \sum_{j=1,\ldots k_1} c_p^j$$

In the example processing flow (300) of FIG. 3, for the COE stage, the confidence estimation tool provides as inputs (328) relevant historical incidents $h_{[1]}, h_{[2]}, \ldots, h_{[k]}$ to the LLM (330), along with the description $d_{query}$ of the current incident and the instruction for analysis $$I_a^{COE}$$

(analysis prompt). The LLM (330) generates $k_1$ instances of analyses, which are shown as $a_1$ to $a_{k1}$. For each of the $k_1$ instances of analyses, the confidence estimation tool prompts the LLM (330) to provide $k_2$ scores, iteratively providing to the LLM (330) the relevant historical incidents $h_{[1]}, h_{[2]}, \ldots, h_{[k]}$, the description $d_{query}$ of the current incident, and the instruction for storing $$I_s^{COE}.$$

For each of the $k_1$ instances of analyses, the LLM (330) generates $k_2$ scores, which are shown in FIG. 3 as values of $\gamma$. The confidence estimation tool then aggregates the scores $\gamma$, producing a score $E(\gamma)$, which is also shown as the verifiability score C.

Figure 4:
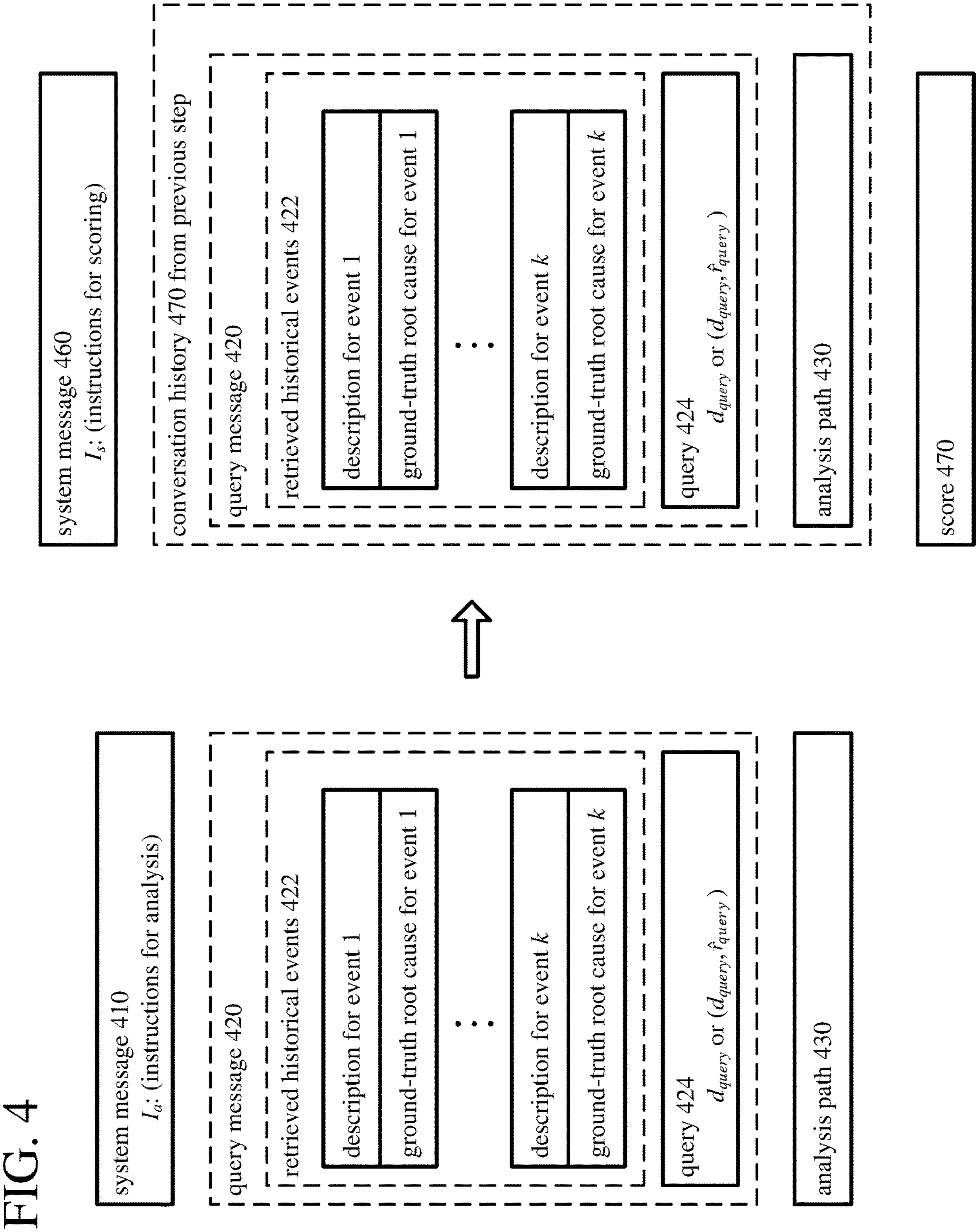
FIG. 4 is a diagram illustrating an example processing flow for scoring of analysis paths.

FIG. 4 shows another example processing flow (400) for scoring of analysis paths. The confidence estimation tool provides the LLM with instructions for analysis as a system message (410). As a query message (420), the confidence estimation tool provides the LLM with retrieved historical events (422) and a query (424) (here, $d_{query}$). The LLM generates an analysis path (430). The confidence estimation tool can repeat this process to obtain multiple analysis paths (430) for a current incident.

For scoring, the confidence estimation tool provides the LLM with instructions for scoring as a system message (460). As a query message (420), the confidence estimation tool provides the LLM with retrieved historical events (422) and a query (424) (here, $d_{query}$). This can be provided as the conversation history (470) from the previous step (analysis). The LLM generates a score (470). The confidence estimation tool can repeat this process to obtain multiple scores (470) for each of the multiple analysis paths (430).

C. Root Cause Evaluation Scoring

The confidence estimation tool then performs root cause evaluation ("RCE") utilizing the information from the relevant historical incidents. During this stage, the LLM is given the relevant historical incidents H including their associated root causes, along with the description $d_{query}$ of the current incident and candidate root cause $\hat{r}_{query}$ of the current incident. The confidence estimation tool asks the LLM to evaluate the LLM-generated candidate root cause of the current incident based on the retrieved historical incidents and their root causes.

For the RCE stage, the confidence estimation tool uses the retrieved historical incidents $H=\{h_1, \ldots h_k\}$, where each $h_i=(d_i, r_i)$ is a pair of historical incident description and its ground-truth root cause. The confidence estimation tool also uses the description $d_{query}$ of the current incident and LLM-generated candidate root cause $\hat{r}_{query}$ of the current incident. With this information, and through prompt-driven interaction with the LLM, the confidence estimation tool determines whether the candidate root cause $\hat{r}_{query}$ is a plausible root cause of the current incident, based on the retrieved historical events.

Concretely, the LLM first generates analysis in textual form, conditioned on the relevant historical incidents H, the description $d_{query}$ of the current incident, the candidate root cause $\hat{r}_{query}$ of the current incident, and an instruction for analysis $$I_a^{RCE}.$$

For example, following certain rubrics, the instruction for analysis $$I_a^{RCE}$$

is:

Prompt listing for $I_\alpha^{RCE}$

Instructions
You are required to evaluate the candidate root cause for the incident description from the user input. You should mainly focus on the following aspects:
- The historical incidents are similar to the current incident. You should consider their root causes when evaluating the quality of the candidate root cause to the current incident.
- The root cause given should not hallucinate information not present in the description.
- The root cause given should not be a simple summary of incident description.
Requirements for writing analysis
1. Compare the candidate root cause with the ground truth root causes given to the historical incidents. Discuss whether the candidate root cause can be supported by the historical incidents and root causes, or whether they provide suggestive hints to the current incident.
2. Discuss the relevance between the candidate root cause and its own incident description of the current incident.
3. Summarize on the trustworthiness of the candidate root cause.
Be concise.
Below are similar cases from historical incidents for your reference. Consider their root causes when evaluating the candidate root cause given to the current incident.

-continued

| Prompt listing for $I_\alpha^{RCE}$ |
|---|
| >>> Similar Historical Incidents: |
| { } |
| >>> Current Incident: |
| { } |
| >>> Candidate Root Cause: |
| { } |
| Write an evaluation for the above candidate root cause given to the current incident based on relevant historical incidents to determine its usefulness. |

The confidence estimation tool samples multiple analyses $$a_j^s$$

for the current incident:

$$a_j^s \sim p(a \mid H, d_{query}, \hat{r}_{query}, I_a^{RCE}), \text{ where } j = 1, 2, \ldots, k_1', \text{ and } k_1'$$

is the number of analyses for the current incident. Thus, for j iterations, the confidence estimation tool prompts the LLM to provide analysis based on the relevant historical incidents H, the description $d_{query}$ of the current incident, the candidate root cause $\hat{r}_{query}$ of the current incident, and the instruction for analysis $$I_a^{RCE}.$$

Even when the information provided in the prompt is unchanged, the LLM generates different analysis due to changes in one or more internal conditions of the LLM (e.g., when the value of a control parameter for the LLM causes the LLM to generate different responses at different times, even for the same prompt).

The confidence estimation tool then prompts the LLM to provide scores for the LLM-generated analyses. For example, the confidence estimation tool samples $k_2'$ responses from the LLM about scores for each LLM-generated analysis. Compared to scoring in the COE stage, scoring of the candidate root cause in the RCE stage is more complicated, considering dimensions such as truthfulness (i.e., whether the candidate root cause contains false information), groundedness (i.e., to what extent the historical incidents support or go against the candidate root cause), and informativeness (i.e., the level of detail in the candidate root cause, and its adequacy in directing engineers for troubleshooting, relative to the guidance offered for analogous historical incidents). Therefore, instead of simply asking for binary responses, the confidence estimation tool prompts the LLM to produce scores on a specified scale conditioning on each analysis. For example, the instruction for scoring $$I_s^{RCE}$$

is:

| Prompt listing for $I_s^{RCE}$ |
|---|
| # Instructions |
| ## You are required to evaluate the candidate root cause for the incident description from the user input. You should mainly focus on the following aspects: |
| - The historical incidents are similar to the current incident. You should consider their root causes when evaluating the quality of the candidate root cause to the current incident. |
| - The root cause given should not hallucinate information not present in the description. |
| - The root cause given should not be a simple summary of incident description. |
| - The root cause should be able to guide cloud engineers' trouble shooting to resolve the current issue. |
| ## When you are asked to score, you should **NOT** explain your choice. |
| ## You should score from 1 to 5. The higher the score, the higher quality you think the candidate root cause is. |
| Based on the analysis, how helpful do you think the candidate root cause is? Score from 1 to 5. Only respond with an integer from 1 to 5. |

For each of the $k_1'$ instances of analysis $$a_j^s,$$

the confidence estimation tool samples $k_2'$ scores $$s_p^j \sim p(s \mid H, d_{query}, \hat{r}_{query}, I_s^{RCE}, a_j^s), \text{ where } p = 1, 2, \ldots, k_2', \text{ and } k_2'$$

is the number of intermediate scores for the $j^{th}$ analysis $$a_j^s.$$

Thus, for p iterations per analysis $$a_j^s,$$

the confidence estimation tool prompts the LLM to provide a score based on the relevant historical incidents H, the description $d_{query}$ of the current incident, the candidate root cause $\hat{r}_{query}$ of the current incident, the instruction for scoring $$I_s^{RCE}, \text{ and the analysis } a_j^s.$$

Even when the information provided in the prompt is unchanged, the LLM generates different analysis due to changes in one or more internal conditions of the LLM (e.g., when the value of a control parameter for the LLM causes the LLM to generate different responses at different times, even for the same prompt).

The confidence estimation tool then estimates the RCE score as the empirical mean across all scores obtained from all analyses:

$$E(s) = \frac{1}{k_1' \times k_2'} \sum_{p=1,\ldots k_2'} \sum_{j=1,\ldots k_1'} s_p^j$$

In the example processing flow (300) of FIG. 3, for the RCE stage, the confidence estimation tool provides as inputs (329) relevant historical incidents $h_{[1]}, h_{[2]}, \ldots, h_{[k]}$ to the LLM (330), along with the description $d_{query}$ of the current incident, the instruction for analysis $$I_a^{RCE}$$

(analysis prompt), and the LLM-generated candidate root cause $\hat{r}_{query}$. The LLM (330) generates $k_1$ instances of analyses, which are shown as $a_1$ to $a_{k1}$. For each of the $k_1$ instances of analyses, the confidence estimation tool prompts the LLM (330) to provide $k_2$ scores, iteratively providing to the LLM (330) the relevant historical incidents $h_{[1]}, h_{[2]}, \ldots, h_{[k]}$, the description $d_{query}$ of the current incident, the instruction for storing $$I_s^{RCE},$$

and the candidate root cause $f_{query}$. For each of the $k_1$ instances of analyses, the LLM (330) generates $k_2$ scores, which are shown in FIG. 3 as values of $\gamma$. The confidence estimation tool then aggregates the scores $\gamma$, producing a score $E(\gamma)$, which is also shown as the root cause score S.

In the example processing flow (400) of FIG. 4, the confidence estimation tool provides the LLM with instructions for analysis as a system message (410). As a query message (420), the confidence estimation tool provides the LLM with retrieved historical events (422) and a query (424) (here, $d_{query}$ and $\hat{r}_{query}$). The LLM generates an analysis path (430). The confidence estimation tool can repeat this process to obtain multiple analysis paths (430) for a current incident.

For scoring, the confidence estimation tool provides the LLM with instructions for scoring as a system message (460). As a query message (420), the confidence estimation tool provides the LLM with retrieved historical events (422) and a query (424) (here, $d_{query}$ and $\hat{r}_{query}$). This can be provided as the conversation history (470) from the previous step (analysis). The LLM generates a score (470). The confidence estimation tool can repeat this process to obtain multiple scores (470) for each of the multiple analysis paths (430).

D. Estimating Confidence from COE and RCE Scores.

To obtain a final confidence score for a candidate root cause, the confidence estimation tool combines the COE and RCE scores together using a calibrated confidence mapping model. Given the COE and RCE scores obtained from two-step confidence estimation, the confidence estimation tool seeks a calibrated confidence mapping model that provides an optimal mapping into the final confidence score.

The confidence estimation tool can calibrate the confidence mapping model using a subset of the historical incidents from the database D. The subset is also called the validation set. COE and RCE scores are determined for each of the historical incidents in the validation set. Labels are also determined for the historical incidents in the validation set. The term $l_j$ indicates the label for the $j^{th}$ historical event in the validation set.

For the calibration process, assume m categories of confidence level evenly divide the interval [0, 1]. Each root cause is to be assigned to the category that best indicates the confidence level. Assume $t_0, \ldots, t_m$ are thresholds for each category, where to =0 and $t_m$=1 are minimum and maximum possible scores from $\pi$ (.,.), respectively. The score transformation function $\pi$ (.,.), which is also referred to as a confidence mapping model, maps different combinations of COE score and RCE score to different final confidence estimates. In some example implementations, the score transformation function $\pi$ (.,.) maps a given combination of COE score and RCE score to an output value between 0 and 1. In general, the optimization objective for the calibration process takes the form:

$$J(t_1, \ldots, t_{m-1}, \theta) = \min_{t_0 < \ldots < t_m, \theta} \sum_{i=1}^{m-1} \omega(i) \left| \pi(c_j, s_j) - \frac{\sum_j IND[t_i \le \pi(c_j, s_j) \le t_{i+1}] * IND[l_j]}{\sum_j IND[t_i \le \pi(c_j, s_j) \le t_{i+1}]} \right|$$

where ω(.) is a weighting function that determines the relative importance of each category. In this way, as part of the calibration process using a set of historical incidents for validation, the confidence estimation tool finds thresholds $t_0, \ldots, t_m$ for the categories as well as model parameters θ for the score transformation function (confidence mapping model) $\pi(c_j, s_j)$.

If $w(i)=\Sigma_j$ IND $[t_i \le \pi(c_j, s_j) \le t_{i+1}]$, the optimization objective is the Expected Calibration Error ("ECE") score. Alternatively, the weighting mechanism of each bin can be tailored for different scenarios.

In the example processing flow (300) of FIG. 3, labels/are determined for the historical incidents in the validation set using the LLM (330). For a historical incident $h_k=(d_k, r_k)$ in the validation set, the LLM (330) scores similarity of an LLM-generated root cause $\hat{r}_k$ for the historical incident to a ground-truth root cause $r_k$ for the historical incident. A label (True/False) is assigned if the score for LLM-generated root cause $\hat{r}_k$ for the historical incident in the validation set satisfies a threshold. The confidence estimation tool uses the labels/, verifiability scores C, and root cause scores S for the incidents in the validation set.

V. Example Techniques for Using a Calibrated Confidence Mapping Model.

Figure 5A:
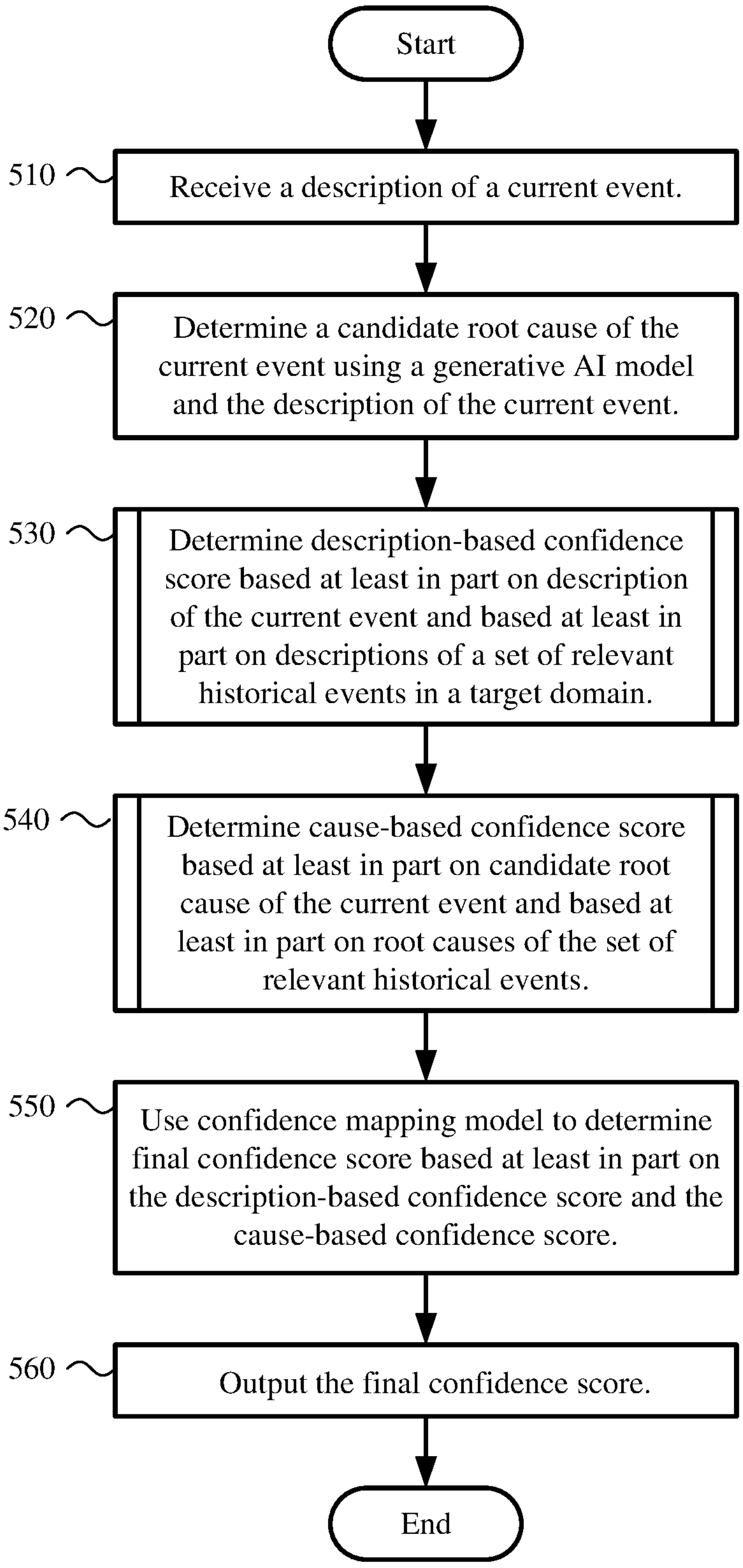
FIGS. 5*a* and 5*b* are flowcharts illustrating generalized techniques for using and calibrating, respectively, a confidence mapping model to estimate confidence of a candidate root cause generated by a generative AI model.

FIG. 5*a* illustrates a generalized technique (501) for using a confidence mapping model to estimate confidence of a candidate root cause generated by a generative AI model such as a generative language model (e.g., an LLM). A confidence estimation tool, as described with reference to FIG. 2 or otherwise, can perform the technique (501).

To start, the confidence estimation tool receives (510) a description of a current event. For example, the description of the current event is a textual description of the current event. The description of the current event can be provided as input to the computer system that implements the confidence estimation tool, e.g., from a keyboard or other input device.

Next, using the description of the current event and a generative AI model, the confidence estimation tool determines (520) a candidate root cause of the current event. For example, the confidence estimation tool provides, to the generative AI model, the description of the current event and an instruction to find the candidate root cause of the current event, and the confidence estimation tool receives, from the generative AI model, the candidate root cause of the current event. In some example implementations, the candidate root cause of the current event is a textual response from the generative AI model. The generative AI model can be an LLM implemented using ChatGPT 3, ChatGPT 3.5, ChatGPT 4.0, Text-Da Vinci-003, or some other LLM. Alternatively, the generative AI model can be another type of generative AI model. In general, the generative AI model is a "black box" for the confidence estimation tool, which provides prompts to the generative AI model and receives generated content as output from the generative AI model.

Approaches described herein work even if the generative AI model is configured for general-domain applications and lacks domain-specific knowledge for a target domain. The target domain can be any of various domains for which the current event is an incident or symptoms. For example, the target domain is root cause analysis for failures of mechanical systems, root cause analysis for medical conditions, root cause analysis for data center incidents, root cause analysis for failures of customer devices, or another target domain.

Approaches described herein for confidence estimation also work if the generative AI model has been trained, at least in part, using a dataset for a target domain as well as datasets in one or more other domains. In this case, the generative AI model may have at least some domain-specific knowledge in the target domain as well as domain-specific knowledge in the other domain(s) and/or general-domain knowledge.

The confidence estimation tool determines (530) a description-based confidence score based at least in part on the description of the current event and based at least in part on descriptions of a set of relevant historical events in the target domain. In general, for the set of relevant historical events, relevance depends on semantic similarity between the description of the current event and the descriptions of the set of relevant historical events, respectively. For example, the confidence estimation tool performs operations as described in section VII to determine the description-based confidence score. Alternatively, the confidence estimation tool determines the description-based confidence score in some other way.

The confidence estimation tool also determines (540) a cause-based confidence score based at least in part on the candidate root cause of the current event and based at least in part on root causes of the set of relevant historical events. For example, the confidence estimation tool performs operations as described in section VIII to determine the cause-based confidence score. Alternatively, the confidence estimation tool determines the cause-based confidence score in some other way.

The confidence estimation tool uses (550) a confidence mapping model to determine a final confidence score based at least in part on the description-based confidence score and the cause-based confidence score. In general, the confidence estimation tool maps the description-based confidence score and the cause-based confidence score to the final confidence score according to the confidence mapping model, which has been calibrated for a target domain. For example, the confidence estimation tool provides, as inputs to the confidence mapping model, the description-based confidence score and the cause-based confidence score, and the confidence estimation tool receives, as output from the confidence mapping model, the final confidence score.

Finally, the confidence estimation tool outputs the final confidence score. For example, the confidence estimation tool displays the final confidence score along with the candidate root cause. Or, as another example, the confidence estimation tool provides the final confidence score to another tool.

FIG. 5*a* shows operations performed to estimate a final confidence score for a candidate root cause generated by a generative AI model for a single current event. The operations can be repeated to estimate different final confidence scores for different candidate root causes generated by the generative AI model for the same current event. Or, the operations can be repeated to estimate final confidence scores for candidate root causes generated by the generative AI model for different current events.

VI. Example Techniques for Calibrating a Confidence Mapping Model.

Figure 5B:
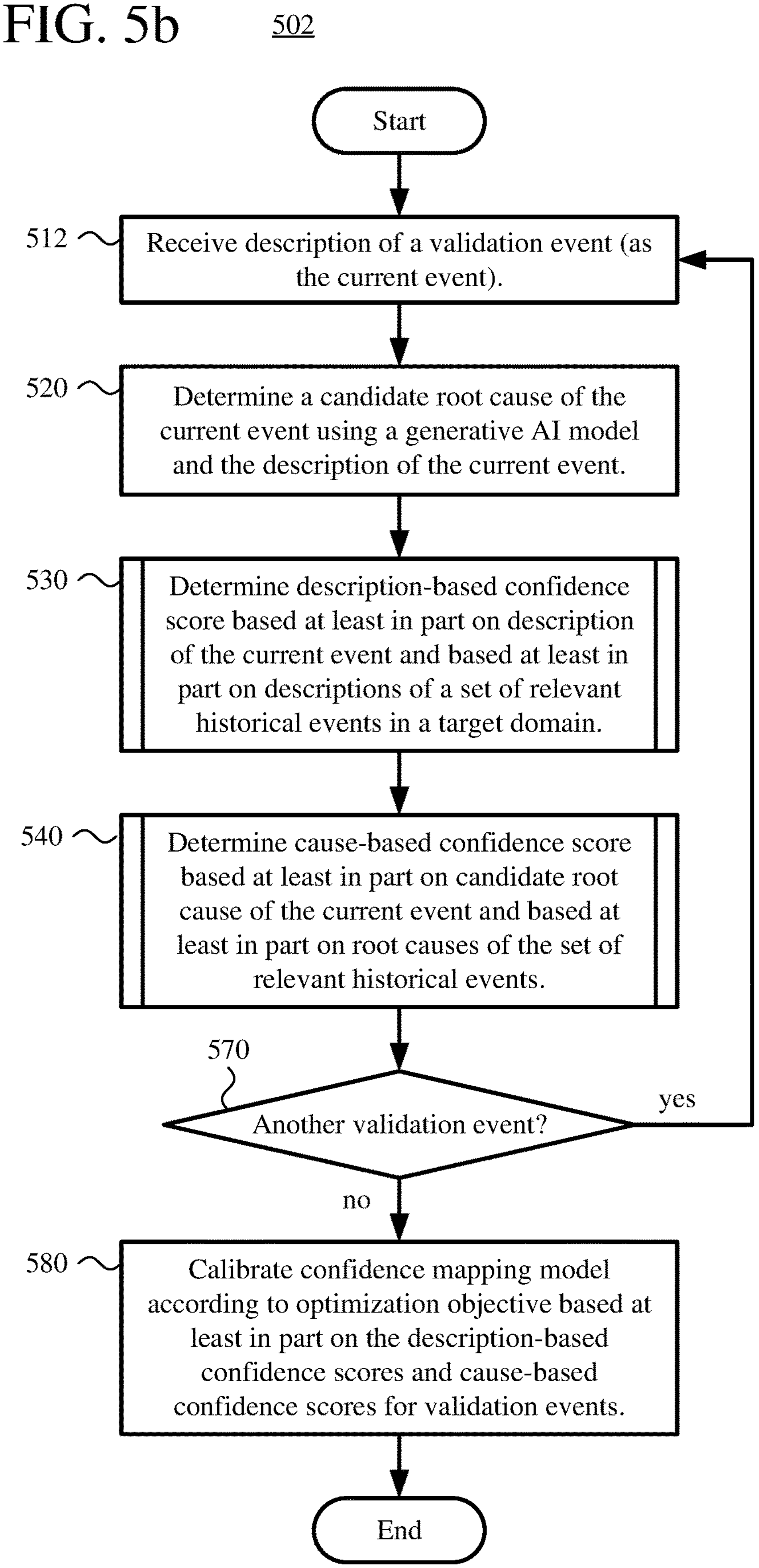

FIG. 5*b* illustrates a generalized technique (502) for calibrating a confidence mapping model used to estimate confidence of a candidate root cause generated by a generative AI model such as a generative language model (e.g., LLM). A confidence estimation tool, as described with reference to FIG. 2 or otherwise, can perform the technique (502).

In FIG. 5*b*, the confidence estimation tool repeats certain operations for each of multiple validation events of a validation set. For each of the validation events, the confidence estimation tool performs those operations for the validation event as a "current" event. The validation set is a part of a set of available historical events, with each historical event having a description of the historical event and ground-truth root cause of the historical event. Within the set of available historical events, some historical events are used as the validation set for calibration, and other historical events can be reserved for testing the results of calibration. The remaining historical events provide a pool from which relevant historical events are retrieved.

To start, the confidence estimation tool receives (512) a description of the next validation event (current event). For example, the description of the current event (validation event) is a textual description of the current event. The description of the current event (validation event) can be provided from a database of historical events that include the validation events of the validation set.

Next, using the description of the current event (validation event) and a generative AI model, the confidence estimation tool determines (520) a candidate root cause of the current event (validation event). For example, the confidence estimation tool provides, to the generative AI model, the description of the current event and an instruction to find the candidate root cause of the current event, and the confidence estimation tool receives, from the generative AI model, the candidate root cause of the current event. In some example implementations, the candidate root cause of the current event is a textual response from the generative AI model. The generative AI model can be an LLM implemented using ChatGPT 3, ChatGPT 3.5, ChatGPT 4.0, Text-Da Vinci-003, or some other LLM. Alternatively, the generative AI model can be another type of generative AI model. In general, the generative AI model is a "black box" for the confidence estimation tool, which provides prompts to the generative AI model and receives generated content as output from the generative AI model.

Approaches described herein work even if the generative AI model is configured for general-domain applications and lacks domain-specific knowledge for a target domain. The target domain can be any of various domains for which the current event is an incident or symptoms. For example, the target domain is root cause analysis for failures of mechanical systems, root cause analysis for medical conditions, root cause analysis for data center incidents, root cause analysis for failures of customer devices, or another target domain.

Approaches described herein for confidence calibration also work if the generative AI model has been trained, at least in part, using a dataset for a target domain as well as datasets in one or more other domains. In this case, the generative AI model may have at least some domain-specific knowledge in the target domain as well as domain-specific knowledge in the other domain(s) and general-domain knowledge.

The confidence estimation tool determines (530) a description-based confidence score based at least in part on the description of the current event (validation event) and based at least in part on descriptions of a set of relevant historical events in the target domain. In general, for the set of relevant historical events, relevance depends on semantic similarity between the description of the current event and the descriptions of the set of relevant historical events, respectively. For example, the confidence estimation tool performs operations as described in section VII to determine the description-based confidence score. Alternatively, the confidence estimation tool determines the description-based confidence score in some other way.

The confidence estimation tool also determines (540) a cause-based confidence score based at least in part on the candidate root cause of the current event (validation event) and based at least in part on root causes of the set of relevant historical events. For example, the confidence estimation tool performs operations as described in section VIII to determine the cause-based confidence score. Alternatively, the confidence estimation tool determines the cause-based confidence score in some other way.

The confidence estimation tool checks (570) whether to continue for another validation event in the validation set. If so, the confidence estimation tool receives (512) a description of the next validation event in the validation set and performs operations for that next validation event as the current event.

If all validation events have been processed, the confidence estimation tool calibrates (580) a confidence mapping model according to an optimization objective based at least in part on the description-based confidence scores and the cause-based confidence scores for the multiple validation events, respectively. For example, the optimization objective is minimization of score according to an expected calibration error ("ECE") metric. Or, as another example, the optimization objective is minimization of score according to an error metric with bin-specific weights from a weighting function. Alternatively, the optimization objective uses some other metric. For the calibration process, bin thresholds can separate bins of a confidence interval. In this case, the optimization objective can use calibrated binning, such that the bin thresholds are adjusted according to the optimization objective. Or, the optimization objective can use uniform binning, such that the bin thresholds are uniformly spaced.

In some example implementations, the calibration of the confidence mapping model is also based at least in part on labels for the multiple validation events, respectively. A label for a validation event indicates whether the model-generated candidate root cause for the validation event is correct or not correct. Typically, labels for the validation events are assigned before calibrating the confidence mapping model. The label can be true/false, yes/no, I/O, or another indicator. The labels can be domain-specific indicators for a target domain. The label for a validation event can be assigned by a human reviewer, comparing the model-generated candidate root cause for the validation event to a ground-truth root cause for the validation event. Alternatively, the confidence estimation tool can use the generative AI model to determine labels for the validation events, respectively. For each of the validation events, using the generative AI model, the confidence estimation tool determines a label score for a candidate root cause of the validation event compared to a ground-truth root cause of the validation event. The confidence estimation tool can prompt the generative AI model to provide one or more scores that quantify the similarity of the candidate root cause and ground-truth root cause for the validation event, then set a label score based on the model-provided scores. The confidence estimation tool then compares the label score to a label score threshold. If the label score satisfies the label score threshold, the label for validation event is true (or yes, or 1). Otherwise, the label for the validation event is false (or no, or 0).

VII. Example Techniques Determining a Description-based Confidence Score.

Figure 6:
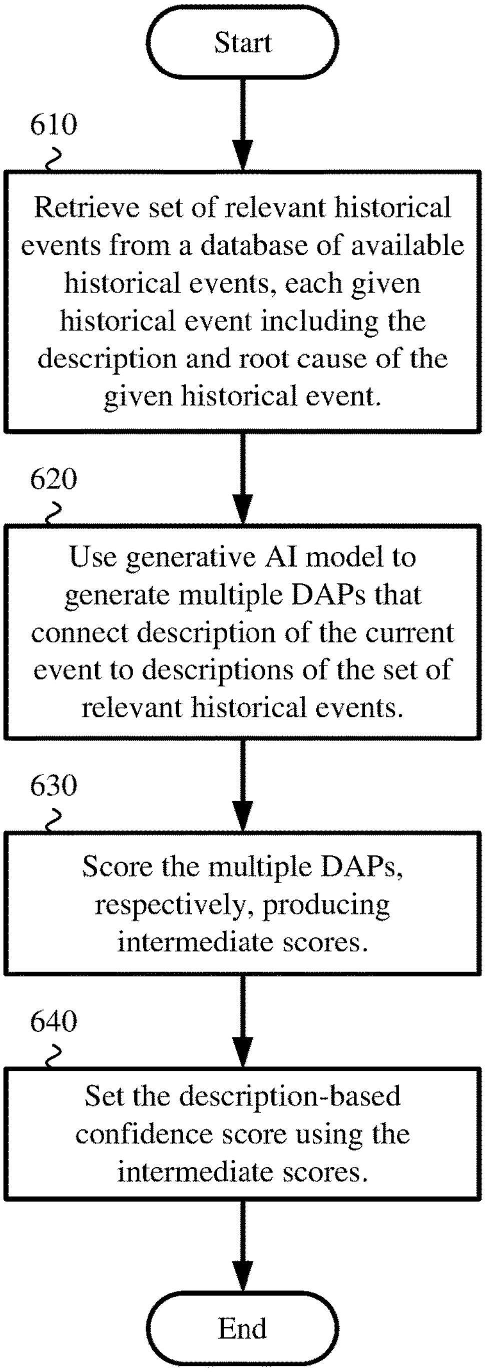
FIGS. 6 and 7 are flowcharts illustrating example techniques for determining description-based confidence scores and cause-based confidence scores, respectively.

FIG. 6 shows an example technique (600) for determining a description-based confidence score. A confidence estimation tool, as described with reference to FIG. 2 or otherwise, can perform the technique (600) when using or calibrating a confidence mapping model to estimate confidence of an model-generated candidate root cause.

To start, the confidence estimation tool retrieves (610) a set of relevant historical events from a database of available historical events. Each given historical event of the available historical events includes the description of the given historical event and the root cause of the given historical event. In general, for the set of relevant historical events, relevance depends on semantic similarity between the description of the current event and the descriptions of the set of relevant historical events, respectively. For example, the set of relevant historical events can include the "top x" historical events according to similarity score, where x depends on implementation (e.g., x is 15, 25, or some other count of historical events). To retrieve the set of relevant historical events, in some example implementations, the confidence estimation tool uses a retrieval model that, to measure relevance, quantifies semantic similarity between the description of the current event and the descriptions of the set of relevant historical events, respectively. For example, the retrieval model is a pre-trained retrieval model. The retrieval model can implement an artificial intelligence similarity search algorithm, for example, as provided in the FAISS library. Alternatively, to measure relevance using semantic similarity, the retrieval model can determine an embedding for the description of the current event and, for each given historical event of the available historical events in the database, determine a similarity score between an embedding for the description of the given historical event and the embedding for the description of the current event. The retrieval model then uses the similarity scores to identify the set of relevant historical events.

Next, the confidence estimation tool uses (620) the generative AI model to generate multiple description analysis paths ("DAPs") that connect the description of the current event to the descriptions of the set of relevant historical events. For example, for a given DAP of the multiple DAPs, the confidence estimation tool provides, to the generative AI model, the description of the current event, the descriptions of the set of relevant historical events, and an instruction to analyze whether the set of relevant historical events is helpful in finding the candidate root cause of the current event. The confidence estimation tool receives, from the generative AI model, the given DAP. In some example implementation, the same instruction is used to generate each of the multiple DAPs, and an internal condition of the generative AI model causes differences between the multiple DAPs. For example, a control parameter (such as temperature) for the generative AI model is assigned a value that causes differences between responses from the generative AI model at different times. Alternatively, slightly different instructions can be used to generate each of the multiple DAPs, or slightly different sets of relevant historical events can be used to generate each of the multiple DAPs.

The confidence estimation tool scores (630) the multiple DAPs, respectively, producing intermediate scores. The intermediate scores can be binary values (e.g., helpful/not helpful, good/bad, yes/no, 1/0, or another indicator). Or, the intermediate scores can be quantified in some other way. For a given DAP of the multiple DAPs, the confidence estimation tool provides, to the generative AI model, the description of the current event, the descriptions of the set of relevant historical events, the given DAP, and an instruction to score whether the set of relevant historical events is helpful in finding the candidate root cause of the current event according to the given DAP. (The generative AI model can also use the conversation history from earlier analysis used to generate the given DAP.) The confidence estimation tool receives, from the generative AI model, one of the intermediate scores for the given DAP. The confidence estimation tool can iteratively provide such inputs and receive different intermediate scores for the given DAP. In some example implementation, the same instruction is used to generate each of the intermediate scores for the given DAP, and an internal condition of the generative AI model causes differences between the multiple intermediate scores for the given DAP. For example, a control parameter (such as temperature) for the generative AI model is assigned a value that causes differences between responses from the generative AI model at different times. Alternatively, slightly different instructions can be used to generate each of the multiple intermediate scores for the given DAP, or slightly different sets of relevant historical events can be used to generate each of the multiple intermediate scores for the given DAP.

The confidence estimation tool can iteratively determine intermediate scores for the respective DAPs. As shown in FIG. 6, the confidence estimation tool can use the generative AI model to generate the multiple DAPs and then, after the multiple DAPs have been generated, use the generative AI model to score the multiple DAPs, respectively. Alternatively, the confidence estimation tool can use the generative AI model to generate and score the multiple DAPS one DAP after another, using interleaved operations to generate a given DAP, among the multiple DAPs, and then score the given DAP, before continuing with the next DAP.

Finally, the confidence estimation tool sets (640) the description-based confidence score using the intermediate scores. For example, the confidence estimation tool aggregates the intermediate scores to set the description-based confidence score. The confidence estimation tool can aggregate the intermediate scores by determining the average of the intermediate scores, or the confidence estimation tool can aggregate the intermediate scores in some other way.

VIII. Example Techniques Determining a Cause-based Confidence Score.

Figure 7:
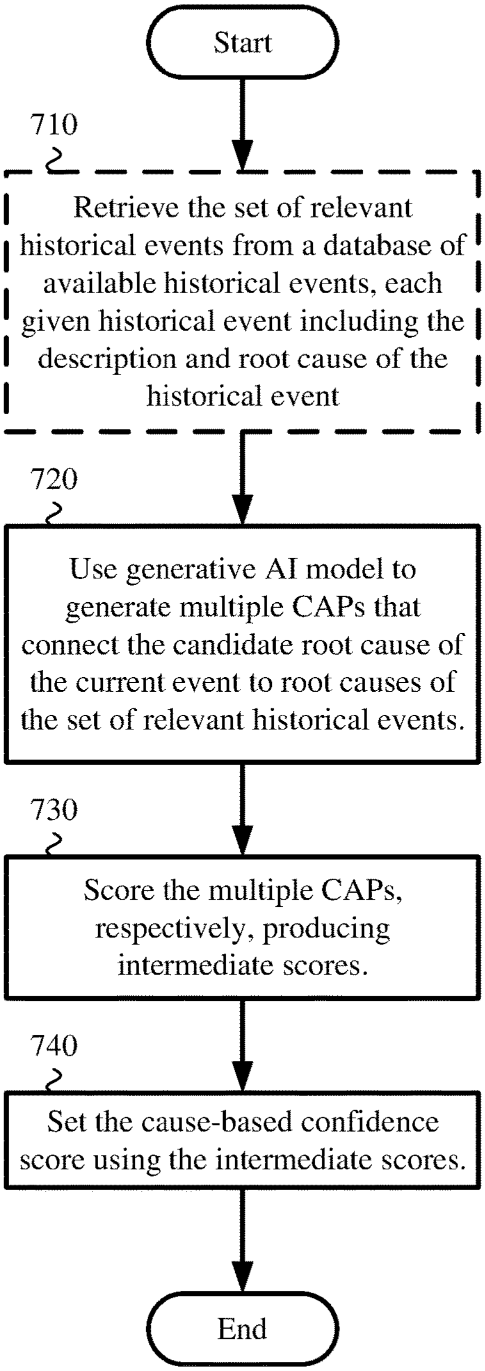

FIG. 7 shows an example technique (700) for determining a cause-based confidence score. A confidence estimation tool, as described with reference to FIG. 2 or otherwise, can perform the technique (700) when using or calibrating a confidence mapping model to estimate confidence of an model-generated candidate root cause.

To start, the confidence estimation tool retrieves (710) a set of relevant historical events from a database of available historical events. Each given historical event of the available historical events includes the description of the given historical event and the root cause of the given historical event. In general, for the set of relevant historical events, relevance depends on semantic similarity between the description of the current event and the descriptions of the set of relevant historical events, respectively. For example, the set of relevant historical events can include the "top x" historical events according to similarity score, where x depends on implementation (e.g., x is 15, 25, or some other count of historical events). To retrieve the set of relevant historical events, in some example implementations, the confidence estimation tool uses a retrieval model that, to measure relevance, quantifies semantic similarity between the description of the current event and the descriptions of the set of relevant historical events, respectively, for example, as described in the previous section. Alternatively, to retrieve the set of relevant historical events, the confidence estimation tool can simply reuse results of a previous retrieval operation (e.g., a retrieval operation performed when determining a description-based confidence score).

Next, the confidence estimation tool uses (720) the generative AI model to generate multiple cause analysis paths ("CAPs") that connect the candidate root cause of the current event to the root causes of the set of relevant historical events. For example, for a given CAP of the multiple CAPs, the confidence estimation tool provides, to the generative AI model, the candidate root cause of the current event, the root causes of the set of relevant historical events, and an instruction to analyze whether the set of relevant historical events validates the candidate root cause of the current event. (The set of relevant historical events validates the candidate root cause of the current event if the set of relevant historical events supports or suggests the candidate root cause of the current event.) The confidence estimation tool receives, from the generative AI model, the given CAP. In some example implementation, the same instruction is used to generate each of the multiple CAPs, and an internal condition of the generative AI model causes differences between the multiple CAPs. For example, a control parameter (such as temperature) for the generative AI model is assigned a value that causes differences between responses from the generative AI model at different times. Alternatively, slightly different instructions can be used to generate each of the multiple CAPs, or slightly different sets of relevant historical events can be used to generate each of the multiple CAPs.

When using the generative AI model to generate the multiple CAPs, the confidence estimation tool can also provide, to the generative AI model, the description of the current event along with an instruction to validate the candidate root cause in view of the description of the current event according to one or more conditions. For example, the conditions can include verifying that the candidate root cause does not hallucinate information absent from the description of the current event. As another example, the conditions can include verifying that the candidate root cause is not a simple summary of the description of the current event.

The confidence estimation tool scores (730) the multiple CAPs, respectively, producing intermediate scores. The intermediate scores can be integer values (e.g., in a range of 0 to 5, where a higher score indicates higher quality, or in another range). Or, the intermediate scores can be quantified in some other way. For a given CAP of the multiple CAPs, the confidence estimation tool provides, to the generative AI model, the candidate root cause of the current event, the root causes of the set of relevant historical events, the given CAP, and an instruction to score the candidate root cause of the current event. (The generative AI model can also use the conversation history from earlier analysis used to generate the given CAP.) The confidence estimation tool receives, from the generative AI model, one of the intermediate scores for the given CAP.

When using the generative AI model to produce the intermediate scores, the confidence estimation tool can also provide, to the generative AI model, the description of the current event. Each of the intermediate scores for the given CAP can depend on various factors, such as (a) whether the set of relevant historical events validates the candidate root cause of the current event; (b) the extent to which the candidate root cause does not hallucinate information absent from the description of the current event; (c) the extent to which the candidate root cause is not a simple summary of the description of the current event, and (d) the extent to which the candidate root cause provides actionable guidance.

The confidence estimation tool can iteratively provide such inputs and receive different intermediate scores for the given CAP. In some example implementation, the same instruction is used to generate each of the intermediate scores for the given CAP, and an internal condition of the generative AI model causes differences between the multiple intermediate scores for the given CAP. For example, a control parameter (such as temperature) for the generative AI model is assigned a value that causes differences between responses from the generative AI model at different times. Alternatively, slightly different instructions can be used to generate each of the multiple intermediate scores for the given CAP, or slightly different sets of relevant historical events can be used to generate each of the multiple intermediate scores for the given CAP.

The confidence estimation tool can iteratively determine intermediate scores for the respective CAPs. As shown in FIG. 7, the confidence estimation tool can use the generative AI model to generate the multiple CAPs and then, after the multiple CAPs have been generated, use the generative AI model to score the multiple CAPs, respectively. Alternatively, the confidence estimation tool can use the generative AI model to generate and score the multiple CAPS one CAP after another, using interleaved operations to generate a given CAP, among the multiple CAPs, and then score the given CAP, before continuing with the next CAP.

Finally, the confidence estimation tool sets (740) the cause-based confidence score using the intermediate scores. For example, the confidence estimation tool aggregates the intermediate scores to set the cause-based confidence score. The confidence estimation tool can aggregate the intermediate scores by determining the average of the intermediate scores, or the confidence estimation tool can aggregate the intermediate scores in some other way.

IX. Innovative Features.

The following table shows some of the innovative features described herein for estimating and calibrating confidence for generative AI models.

| | Features |
|---|---|
| A1 | In a computer system, a method comprising:<br>receiving a description of a current event;<br>using a generative artificial intelligence ("AI") model to determine, based on the description of the current event, a candidate root cause of the current event, wherein the candidate root cause of the current event is a textual response from the generative AI model;<br>determining a description-based confidence score based at least in part on the description of the current event and based at least in part on descriptions of a set of relevant historical events in a target domain;<br>determining a cause-based confidence score based at least in part on the candidate root cause of the current event and based at least in part on root causes of the set of relevant historical events; and |

-continued

| | Features |
|---|---|
| | using a confidence mapping model to determine a final confidence score based at least in part on the description-based confidence score and the cause-based confidence score. |
| A2 | The method of feature A1, wherein the using the confidence mapping model to determine the final confidence score comprises: mapping the description-based confidence score and the cause-based confidence score to the final confidence score according to the confidence mapping model. |
| A3 | The method of feature A1, wherein the using the confidence mapping model to determine the final confidence score comprises: providing, as inputs to the confidence mapping model, the description-based confidence score and the cause-based confidence score; and receiving, as output from the confidence mapping model, the final confidence score. |
| A4 | The method of any one of features A1-A3, further comprising: outputting the final confidence score. |
| A5 | The method of feature A4, wherein the outputting the final confidence score comprises: providing the final confidence score to another tool; or displaying the final confidence score along with the candidate root cause. |
| B1 | In a computer system, a method comprising: for each of multiple validation events of a validation set as a current event: receiving a description of the current event; using a generative artificial intelligence ("AI") model to determine, based on the description of the current event, a candidate root cause of the current event, wherein the candidate root cause of the current event is a textual response from the generative AI model; determining a description-based confidence score based at least in part on the description of the current event and based at least in part on descriptions of a set of relevant historical events in a target domain; and determining a cause-based confidence score based at least in part on the candidate root cause of the current event and based at least in part on root causes of the set of relevant historical events; and calibrating a confidence mapping model according to an optimization objective based at least in part on the description-based confidence scores and the cause-based confidence scores for the multiple validation events, respectively. |
| B2 | The method of feature B1, wherein the optimization objective is: minimization of score according to an expected calibration error metric; or minimization of score according to an error metric with bin-specific weights from a weighting function. |
| B3 | The method of feature B1, wherein bin thresholds separate bins of a confidence interval, and wherein the optimization objective: uses uniform binning, such that the bin thresholds are uniformly spaced; or uses calibrated binning, such that the bin thresholds are adjusted according to the optimization objective. |
| B4 | The method of any one of features B1-B3, wherein the calibrating the confidence mapping model is also based at least in part on labels for the multiple validation events, respectively. |
| B5 | The method of feature B4, further comprising, before the calibrating the confidence mapping model, using the generative AI model to determine the labels for the multiple validation events, respectively, including, for each of the multiple validation events: determining a label score for a candidate root cause of the validation event compared to a ground-truth root cause of the validation event; and comparing the label score to a label score threshold. |
| AB1 | The method of any one of features A1-A5 and B1-B5, wherein the description of the current event is a textual description of the current event. |
| AB2 | The method of any one of features A1-A5 and B1-B5, wherein the using the generative AI model to determine the candidate root cause of the current event includes: providing, to the generative AI model, the description of the current event and an instruction to find the candidate root cause of the current event; and receiving, from the generative AI model, the candidate root cause of the current event. |
| AB3 | The method of any one of features A1-A5 and B1-B5, wherein the generative AI model is a large language model ("LLM"), and wherein the LLM is selected from the group consisting of ChatGPT 3, ChatGPT 3.5, ChatGPT 4.0, and Text-DaVinci-003. |
| AB4 | The method of any one of features A1-A5 and B1-B5, wherein the generative AI model is configured for general-domain applications, the generative AI model lacking domain-specific knowledge for the target domain. |
| AB5 | The method of any one of features A1-A5 and B1-B5, wherein the current event is an incident or symptoms, and wherein the target domain is selected from the group consisting of root cause analysis for failures of mechanical systems, root cause analysis for medical conditions, root cause analysis for data center incidents, and root cause analysis for failures of customer devices. |

-continued

| | Features |
|---|---|
| AB6 | The method of any one of features A1-A5, B1-B5, and AB1-AB5, wherein the determining the description-based confidence score comprises: retrieving the set of relevant historical events from a database of available historical events, each given historical event of the available historical events including the description of the given historical event and the root cause of the given historical event. |
| AB7 | The method of feature AB6, wherein the retrieving the set of relevant historical events uses a pre-trained retrieval model that quantifies semantic similarity between the description of the current event and the descriptions of the set of relevant historical events, respectively. |
| AB8 | The method of feature AB7, wherein the pre-trained retrieval model implements an artificial intelligence similarity search algorithm. |
| AB9 | The method of feature AB7, wherein the retrieving the set of relevant historical events includes: determining an embedding for the description of the current event; for each given historical event of the available historical events in the database, determining a similarity score between an embedding for the description of the given historical event and the embedding for the description of the current event; and using the similarity scores to identify the set of relevant historical events. |
| AB10 | The method of feature AB6, wherein the determining the description-based confidence score further comprises: using the generative AI model to generate multiple description analysis paths ("DAPs") that connect the description of the current event to the descriptions of the set of relevant historical events; scoring the multiple DAPs, respectively, producing intermediate scores; and setting the description-based confidence score using the intermediate scores. |
| AB11 | The method of feature AB10, wherein the using the generative AI model to generate the multiple DAPs includes, for a given DAP of the multiple DAPs: providing, to the generative AI model, the description of the current event, the descriptions of the set of relevant historical events, and an instruction to analyze whether the set of relevant historical events is helpful in finding the candidate root cause of the current event; and receiving, from the generative AI model, the given DAP. |
| AB12 | The method of feature AB11, wherein the instruction is used to generate each of the multiple DAPs, and wherein an internal condition of the generative AI model causes differences between the multiple DAPs. |
| AB13 | The method of feature AB10, wherein the scoring the multiple DAPs, respectively, includes, for a given DAP of the multiple DAPs, iteratively: providing, to the generative AI model, the description of the current event, the descriptions of the set of relevant historical events, the given DAP, and an instruction to score whether the set of relevant historical events is helpful in finding the candidate root cause of the current event according to the given DAP; and receiving, from the generative AI model, one of the intermediate scores for the given DAP. |
| AB14 | The method of feature AB13, wherein the instruction is used to score the given DAP for each of the intermediate scores for the given DAP, and wherein an internal condition of the generative AI model causes differences between the intermediate scores for the given DAP. |
| AB15 | The method of feature AB13, wherein, for the scoring the multiple DAPs, the generative AI model uses a conversation history from earlier analysis. |
| AB16 | The method of feature AB13, wherein each of the intermediate scores for the given DAP is a binary value. |
| AB17 | The method of feature AB10, wherein: the multiple DAPs are generated and score one DAP after another using interleaved operations to generate a given DAP, among the multiple DAPs, and score the given DAP; or the multiple DAPs are generated and then, after the multiple DAPs have been generated, the multiple DAPs are scored. |
| AB18 | The method of feature AB10, wherein the setting the description-based confidence score includes: aggregating the intermediate scores. |
| AB19 | The method of feature AB18, wherein the aggregating the intermediate scores includes: determining an average of the intermediate scores. |
| AB20 | The method of any one of feature A1-A5, B1-B5, and AB1-AB5, wherein the determining the cause-based confidence score comprises: retrieving the set of relevant historical events from a database of available historical events, each given historical event of the available historical events including the description of the given historical event and the root cause of the historical event. |
| AB21 | The method of feature AB20, wherein the retrieving the set of relevant historical events uses a pre-trained retrieval model that quantifies semantic similarity between the description of the current event and the descriptions of the set of relevant historical events, respectively. |

-continued

| | Features |
|---|---|
| AB22 | The method of feature AB20, wherein the retrieving the set of relevant historical events re-uses results of a previous retrieval operation. |
| AB23 | The method of feature AB20, wherein the determining the cause-based confidence score further comprises:<br>using the generative AI model to generate multiple cause analysis paths ("CAPs") that connect the candidate root cause of the current event to the root causes of the set of relevant historical events;<br>scoring the multiple CAPs, respectively, producing intermediate scores; and<br>setting the cause-based confidence score using the intermediate scores. |
| AB24 | The method of feature AB23, wherein the using the generative AI model to generate the multiple CAPs includes, for a given CAP of the multiple CAPs:<br>providing, to the generative AI model, the candidate root cause of the current event, the root causes of the set of relevant historical events, and an instruction to analyze whether the set of relevant historical events validates the candidate root cause of the current event; and<br>receiving, from the generative AI model, the given CAP. |
| AB25 | The method of feature AB24, wherein the instruction is used to generate each of the multiple CAPs, and wherein an internal condition of the generative AI model causes differences between the multiple CAPs. |
| AB26 | The method of feature AB24, wherein the set of relevant historical events validates the candidate root cause of the current event if the set of relevant historical events supports or suggests the candidate root cause of the current event. |
| AB27 | The method of feature AB24, wherein the description of the current event is also provided to the generative AI model along with an instruction to validate the candidate root cause in view of the description of the current event by:<br>verifying that the candidate root cause does not hallucinate information absent from the description of the current event; and/or<br>verifying that the candidate root cause is not a simple summary of the description of the current event. |
| AB28 | The method of feature AB23, wherein the scoring the multiple CAPs, respectively, includes, for a given CAP of the multiple CAPs, iteratively:<br>providing, to the generative AI model, the candidate root cause of the current event, the root causes of the set of relevant historical events, the given CAP, and an instruction to score the candidate root cause of the current event; and<br>receiving, from the generative AI model, one of the intermediate scores for the given CAP. |
| AB29 | The method of feature AB28, wherein the instruction is used to score the given CAP for each of the intermediate scores for the given CAP, and wherein an internal condition of the generative AI model causes differences between the intermediate scores for the given CAP. |
| AB30 | The method of feature AB28, wherein, for the scoring the multiple CAPs, the generative AI model uses a conversation history from earlier analysis. |
| AB31 | The method of feature AB28, wherein the description of the current event is also provided to the generative AI model, and wherein each of the intermediate scores for the given CAP depends on one or more of:<br>whether the set of relevant historical events validates the candidate root cause of the current event;<br>extent to which the candidate root cause does not hallucinate information absent from the description of the current event;<br>extent to which the candidate root cause is not a simple summary of the description of the current event; and<br>extent to which the candidate root cause provides actionable guidance. |
| AB32 | The method of feature AB28, wherein each of the intermediate scores for the given CAP is an integer value. |
| AB33 | The method of feature AB23, wherein:<br>the multiple CAPs are generated and scored one CAP after another using interleaved operations to generate a given CAP, among the multiple CAPs, and score the given CAP; or<br>the multiple CAPs are generated and then, after the multiple CAPs have been generated, the multiple CAPs are scored. |
| AB34 | The method of feature AB23, wherein the setting the cause-based confidence score includes:<br>aggregating the intermediate scores. |
| AB35 | The method of feature AB34, wherein the aggregating the intermediate scores includes:<br>determining an average of the intermediate scores. |
| AB36 | One or non-transitory computer-readable media having stored thereon computer-executable instructions for causing a processor set, when programmed thereby, to perform operations recited in any one of features A1-A5, B1-B5, and AB1-AB35. |
| AB37 | A computer system comprising a processor set and memory, the computer system being programmed to perform operations recited in any one of features A1-A5, B1-B5, and AB1-AB35. |

X. Example Computer Systems.

Figure 8:
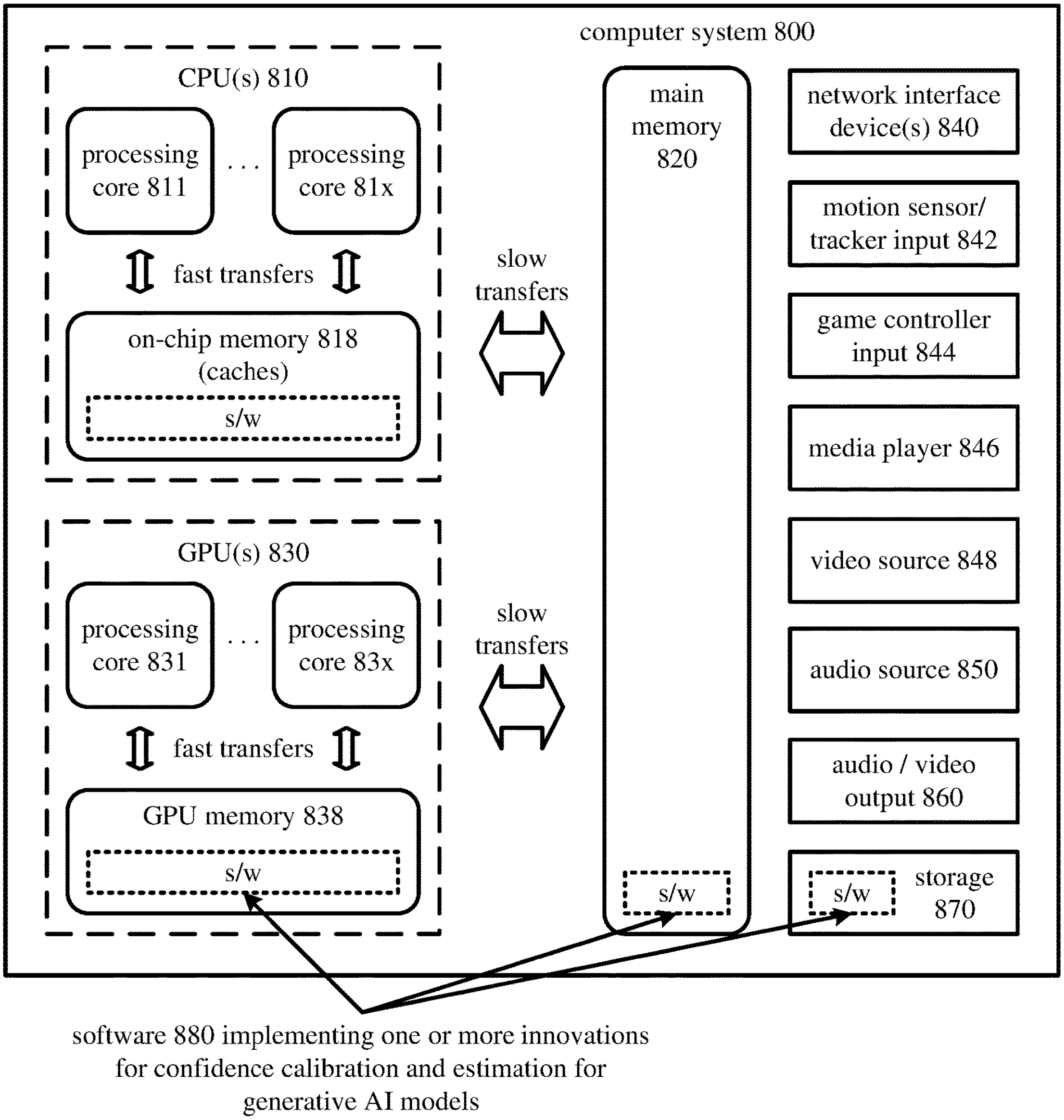
FIG. 8 is a diagram illustrating an example computer system in which some described embodiments can be implemented.

FIG. 8 illustrates a generalized example of a suitable computer system (800) in which several of the described innovations may be implemented. The innovations described herein relate to confidence calibration and estimation for generative AI models. The computer system (800) is not intended to suggest any limitation as to scope of use or functionality, as the innovations may be implemented in diverse computer systems, including special-purpose computer systems.

With reference to FIG. 8, the computer system (800) includes one or more processing cores (810 . . . 81$x$) and local memory (818) of a central processing unit ("CPU") or multiple CPUs. The processing core(s) (810 . . . 81$x$) are, for example, processing cores on a single chip, and execute computer-executable instructions. The number of processing core(s) (810 . . . 81$x$) depends on implementation and can be, for example, 4 or 8. The local memory (818) may be volatile memory (e.g., registers, cache, random access memory ("RAM")), non-volatile memory (e.g., read-only memory ("ROM"), electrically erasable programmable ROM ("EEPROM"), flash memory), or some combination of the two, accessible by the respective processing core(s) (810 . . . 81$x$). Alternatively, the processing cores (810 . . . 81$x$) can be part of a system-on-a-chip ("SoC"), application-specific integrated circuit ("ASIC"), or other integrated circuit.

The local memory (818) can store software (880) implementing aspects of the innovations for confidence calibration and estimation for generative AI models, for operations performed by the respective processing core(s) (810 . . . 81$x$), in the form of computer-executable instructions. In FIG. 8, the local memory (818) is on-chip memory such as one or more caches, for which access operations, transfer operations, etc. with the processing core(s) (810 . . . 1$x$) are fast.

The computer system (800) also includes processing cores (830 . . . 83$x$) and local memory (838) of a graphics processing unit ("GPU") or multiple GPUs. The number of processing cores (830 . . . 83$x$) of the GPU depends on implementation. The processing cores (830 . . . 83$x$) are, for example, part of single-instruction, multiple data ("SIMD") units of the GPU. The SIMD width n, which depends on implementation, indicates the number of elements (sometimes called lanes) of a SIMD unit. For example, the number of elements (lanes) of a SIMD unit can be 16, 32, 64, or 128 for an extra-wide SIMD architecture. The GPU memory (838) may be volatile memory (e.g., registers, cache, RAM), non-volatile memory (e.g., ROM, EEPROM, flash memory), or some combination of the two, accessible by the respective processing cores (830 . . . 83$x$). The GPU memory (838) can store software (880) implementing aspects of the innovations for confidence calibration and estimation for generative AI models, for operations performed by the respective processing cores (830 . . . 83$x$), in the form of computer-executable instructions such as shader code.

The computer system (800) includes main memory (820), which may be volatile memory (e.g., RAM), non-volatile memory (e.g., ROM, EEPROM, flash memory), or some combination of the two, accessible by the processing core(s) (810 . . . 81$x$, 830 . . . 83$x$). The main memory (820) stores software (880) implementing aspects of the innovations for confidence calibration and estimation for generative AI models, in the form of computer-executable instructions. In FIG. 8, the main memory (820) is off-chip memory, for which access operations, transfer operations, etc. with the processing cores (810 . . . 81$x$, 830 . . . 83$x$) are slower.

More generally, the term "processor" refers generically to any device that can process computer-executable instructions and may include a microprocessor, microcontroller, programmable logic device, digital signal processor, and/or other computational device. A processor may be a processing core of a CPU, other general-purpose unit, or GPU. A processor may also be a specific-purpose processor implemented using, for example, an ASIC or a field-programmable gate array ("FPGA"). A "processing system" is a set of one or more processors, which can be located together or distributed across a network.

The term "control logic" refers to a controller or, more generally, one or more processors, operable to process computer-executable instructions, determine outcomes, and generate outputs. Depending on implementation, control logic can be implemented by software executable on a CPU, by software controlling special-purpose hardware (e.g., a GPU or other graphics hardware), or by special-purpose hardware (e.g., in an ASIC).

The computer system (800) includes one or more network interface devices (840). The network interface device(s) (840) enable communication over a network to another computing entity (e.g., server, other computer system). The network interface device(s) (840) can support wired connections and/or wireless connections, for a wide-area network, local-area network, personal-area network or other network. For example, the network interface device(s) can include one or more Wi-Fi® transceivers, an Ethernet® port, a cellular transceiver and/or another type of network interface device, along with associated drivers, software, etc. The network interface device(s) (840) convey information such as computer-executable instructions, audio or video input or output, or other data in a modulated data signal over network connection(s). A modulated data signal is a signal that has one or more of its characteristics set or changed in such a manner as to encode information in the signal. By way of example, the network connections can use an electrical, optical, RF, or other carrier.

The computer system (800) optionally includes a motion sensor/tracker input (842) for a motion sensor/tracker, which can track the movements of a user and objects around the user. For example, the motion sensor/tracker allows a user (e.g., player of a game) to interact with the computer system (800) through a natural user interface using gestures and spoken commands. The motion sensor/tracker can incorporate gesture recognition, facial recognition and/or voice recognition.

The computer system (800) optionally includes a game controller input (844), which accepts control signals from one or more game controllers, over a wired connection or wireless connection. The control signals can indicate user inputs from one or more directional pads, buttons, triggers and/or one or more joysticks of a game controller. The control signals can also indicate user inputs from a touchpad or touchscreen, gyroscope, accelerometer, angular rate sensor, magnetometer and/or other control or meter of a game controller.

The computer system (800) optionally includes a media player (846) and video source (848). The media player (846) can play DVDs, Blu-ray™ discs, other disc media and/or other formats of media. The video source (848) can be a camera input that accepts video input in analog or digital form from a video camera, which captures natural video. Or, the video source (848) can be a screen capture module (e.g., a driver of an operating system, or software that interfaces with an operating system) that provides screen capture content as input. Or, the video source (848) can be a graphics engine that provides texture data for graphics in a computer-represented environment. Or, the video source (848) can be a video card, TV tuner card, or other video input that accepts input video in analog or digital form (e.g., from a cable input, High-Definition Multimedia Interface ("HDMI") input or other input).

An optional audio source (850) accepts audio input in analog or digital form from a microphone, which captures audio, or other audio input.

The computer system (800) optionally includes a video output (860), which provides video output to a display device. The video output (860) can be an HDMI output or other type of output. An optional audio output (860) provides audio output to one or more speakers.

The storage (870) may be removable or non-removable, and includes magnetic media (such as magnetic disks, magnetic tapes or cassettes), optical disk media and/or any other media which can be used to store information and which can be accessed within the computer system (800). The storage (870) stores instructions for the software (880) implementing aspects of the innovations for confidence calibration and estimation for generative AI models.

The computer system (800) may have additional features. For example, the computer system (800) includes one or more other input devices and/or one or more other output devices. The other input device(s) may be a touch input device such as a keyboard, mouse, pen, or trackball, a scanning device, or another device that provides input to the computer system (800). The other output device(s) may be a printer, CD-writer, or another device that provides output from the computer system (800).

An interconnection mechanism (not shown) such as a bus, controller, or network interconnects the components of the computer system (800). Typically, operating system software (not shown) provides an operating environment for other software executing in the computer system (800), and coordinates activities of the components of the computer system (800).

The computer system (800) of FIG. 8 is a physical computer system. A virtual machine can include components organized as shown in FIG. 8.

The term "application" or "program" refers to software such as any user-mode instructions to provide functionality. The software of the application (or program) can further include instructions for an operating system and/or device drivers. The software can be stored in associated memory. The software may be, for example, firmware. While it is contemplated that an appropriately programmed general-purpose computer or computing device may be used to execute such software, it is also contemplated that hard-wired circuitry or custom hardware (e.g., an ASIC) may be used in place of, or in combination with, software instructions. Thus, examples described herein are not limited to any specific combination of hardware and software.

The term "computer-readable medium" refers to any medium that participates in providing data (e.g., instructions) that may be read by a processor and accessed within a computing environment. A computer-readable medium may take many forms, including non-volatile media and volatile media. Non-volatile media include, for example, optical or magnetic disks and other persistent memory. Volatile media include dynamic random access memory ("DRAM"). Common forms of computer-readable media include, for example, a solid state drive, a flash drive, a hard disk, any other magnetic medium, a CD-ROM, DVD, any other optical medium, RAM, programmable read-only memory ("PROM"), erasable programmable read-only memory ("EPROM"), a USB memory stick, any other memory chip or cartridge, or any other medium from which a computer can read. The term "non-transitory computer-readable media" specifically excludes transitory propagating signals, carrier waves, and wave forms or other intangible or transitory media that may nevertheless be readable by a computer. The term "carrier wave" may refer to an electromagnetic wave modulated in amplitude or frequency to convey a signal.

The innovations can be described in the general context of computer-executable instructions being executed in a computer system on a target real or virtual processor. The computer-executable instructions can include instructions executable on processing cores of a general-purpose processor to provide functionality described herein, instructions executable to control a GPU or special-purpose hardware to provide functionality described herein, instructions executable on processing cores of a GPU to provide functionality described herein, and/or instructions executable on processing cores of a special-purpose processor to provide functionality described herein. In some implementations, computer-executable instructions can be organized in program modules. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computer system.

The terms "system" and "device" are used interchangeably herein. Unless the context clearly indicates otherwise, neither term implies any limitation on a type of computer system or device. In general, a computer system or device can be local or distributed, and can include any combination of special-purpose hardware and/or hardware with software implementing the functionality described herein.

Numerous examples are described in this disclosure, and are presented for illustrative purposes only. The described examples are not, and are not intended to be, limiting in any sense. The presently disclosed innovations are widely applicable to numerous contexts, as is readily apparent from the disclosure. One of ordinary skill in the art will recognize that the disclosed innovations may be practiced with various modifications and alterations, such as structural, logical, software, and electrical modifications. Although particular features of the disclosed innovations may be described with reference to one or more particular examples, it should be understood that such features are not limited to usage in the one or more particular examples with reference to which they are described, unless expressly specified otherwise. The present disclosure is neither a literal description of all examples nor a listing of features of the invention that must be present in all examples.

When an ordinal number (such as "first," "second," "third" and so on) is used as an adjective before a term, that ordinal number is used (unless expressly specified otherwise) merely to indicate a particular feature, such as to distinguish that particular feature from another feature that is described by the same term or by a similar term. The mere usage of the ordinal numbers "first," "second," "third," and so on does not indicate any physical order or location, any ordering in time, or any ranking in importance, quality, or otherwise. In addition, the mere usage of ordinal numbers does not define a numerical limit to the features identified with the ordinal numbers.

When introducing elements, the articles "a," "an," "the," and "said" are intended to mean that there are one or more of the elements. The terms "comprising," including," and "having" are intended to be inclusive and mean that there may be additional elements other than the listed elements.

When a single device, component, module, or structure is described, multiple devices, components, modules, or structures (whether or not they cooperate) may instead be used in place of the single device, component, module, or structure. Functionality that is described as being possessed by a single device may instead be possessed by multiple devices, whether or not they cooperate. Similarly, where multiple devices, components, modules, or structures are described herein, whether or not they cooperate, a single device, component, module, or structure may instead be used in place of the multiple devices, components, modules, or structures. Functionality that is described as being possessed by multiple devices may instead be possessed by a single device. In general, a computer system or device can be local or distributed, and can include any combination of special-purpose hardware and/or hardware with software implementing the functionality described herein.

The respective techniques and tools described herein may be utilized independently and separately from other techniques and tools described herein.

Device, components, modules, or structures that are in communication with each other need not be in continuous communication with each other, unless expressly specified otherwise. On the contrary, such devices, components, modules, or structures need only transmit to each other as necessary or desirable, and may actually refrain from exchanging data most of the time. For example, a device in communication with another device via the Internet might not transmit data to the other device for weeks at a time. In addition, devices, components, modules, or structures that are in communication with each other may communicate directly or indirectly through one or more intermediaries.

As used herein, the term "send" denotes any way of conveying information from one device, component, module, or structure to another device, component, module, or structure. The term "receive" denotes any way of getting information at one device, component, module, or structure from another device, component, module, or structure. The devices, components, modules, or structures can be part of the same computer system or different computer systems. Information can be passed by value (e.g., as a parameter of a message or function call) or passed by reference (e.g., in a buffer). Depending on context, information can be communicated directly or be conveyed through one or more intermediate devices, components, modules, or structures. As used herein, the term "connected" denotes an operable communication link between devices, components, modules, or structures, which can be part of the same computer system or different computer systems. The operable communication link can be a wired or wireless network connection, which can be direct or pass through one or more intermediaries (e.g., of a network).

As used herein, the term "set," when used as a noun to indicate a group of elements, indicates a non-empty group, unless context clearly indicates otherwise. That is, the "set" has one or more elements, unless context clearly indicates otherwise.

A description of an example with several features does not imply that all or even any of such features are required. On the contrary, a variety of optional features are described to illustrate the wide variety of possible examples of the innovations described herein. Unless otherwise specified explicitly, no feature is essential or required.

Further, although process steps and stages may be described in a sequential order, such processes may be configured to work in different orders. Description of a specific sequence or order does not necessarily indicate a requirement that the steps or stages be performed in that order. Steps or stages may be performed in any order practical. Further, some steps or stages may be performed simultaneously despite being described or implied as occurring non-simultaneously. Description of a process as including multiple steps or stages does not imply that all, or even any, of the steps or stages are essential or required. Various other examples may omit some or all of the described steps or stages. Unless otherwise specified explicitly, no step or stage is essential or required. Similarly, although a product may be described as including multiple aspects, qualities, or characteristics, that does not mean that all of them are essential or required. Various other examples may omit some or all of the aspects, qualities, or characteristics.

An enumerated list of items does not imply that any or all of the items are mutually exclusive, unless expressly specified otherwise. Likewise, an enumerated list of items does not imply that any or all of the items are comprehensive of any category, unless expressly specified otherwise.

For the sake of presentation, the detailed description uses terms like "determine" and "select" to describe computer operations in a computer system. These terms denote operations performed by one or more processors or other components in the computer system, and should not be confused with acts performed by a human being. The actual computer operations corresponding to these terms vary depending on implementation.

In the examples described herein, identical reference numbers in different figures indicate an identical component, module, or operation. More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Some of the innovations described herein address one or more of the problems noted in the background. Typically, a given technique or tool does not solve all such problems. It is to be understood that other examples may be utilized and that structural, logical, software, hardware, and electrical changes may be made without departing from the scope of the disclosure.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. One or more non-transitory computer-readable media having stored thereon computer-executable instructions for causing a processing system, when programmed thereby, to perform operations comprising:

receiving a description of a current event;

determining a candidate root cause of the current event using a generative language model and the description of the current event, wherein the candidate root cause of the current event is a textual response from the generative language model;

determining a description-based confidence score based at least in part on the description of the current event and based at least in part on descriptions of a set of relevant historical events in a target domain, wherein, for the set of relevant historical events, relevance depends on semantic similarity between the description of the current event and the descriptions of the set of relevant historical events, respectively;

determining a cause-based confidence score based at least in part on the candidate root cause of the current event and based at least in part on root causes of the set of relevant historical events, including assigning the cause-based confidence score based at least in part on whether the candidate root cause of the current event results from hallucination by the generative language model of features absent from the description of the current event;

using a confidence mapping model to determine a final confidence score based at least in part on the description-based confidence score and the cause-based confidence score, wherein the final confidence score depends at least in part on a level of confidence that the candidate root cause of the current event avoids hallucination by the generative language model; and outputting the final confidence score.

2. The one or more non-transitory computer-readable media of claim 1, wherein the description of the current event is a textual description of the current event.

3. The one or more non-transitory computer-readable media of claim 1, wherein the generative language model is configured for general-domain applications, the generative language model lacking domain-specific knowledge for the target domain.

4. The one or more non-transitory computer-readable media of claim 1, wherein the determining the description-based confidence score comprises:

retrieving the set of relevant historical events from a database of available historical events, each given historical event of the available historical events including the description of the given historical event and the root cause of the given historical event;

using the generative language model to generate multiple description analysis paths ("DAPs") that connect the description of the current event to the descriptions of the set of relevant historical events;

scoring the multiple DAPs, respectively, producing intermediate scores; and setting the description-based confidence score using the intermediate scores.

5. The one or more non-transitory computer-readable media of claim 4, wherein the using the generative language model to generate the multiple DAPs includes, for a given DAP of the multiple DAPs:

providing, to the generative language model, the description of the current event, the descriptions of the set of relevant historical events, and an instruction to analyze whether the set of relevant historical events is helpful in finding the candidate root cause of the current event; and receiving, from the generative language model, the given DAP.

6. The one or more non-transitory computer-readable media of claim 4, wherein the scoring the multiple DAPs, respectively, includes, for a given DAP of the multiple DAPs, iteratively:

providing, to the generative language model, the description of the current event, the descriptions of the set of relevant historical events, the given DAP, and an instruction to score whether the set of relevant historical events is helpful in finding the candidate root cause of the current event according to the given DAP; and receiving, from the generative language model, one of the intermediate scores for the given DAP.

7. The one or more non-transitory computer-readable media of claim 1, wherein the determining the cause-based confidence score comprises:

retrieving the set of relevant historical events from a database of available historical events, each given historical event of the available historical events including the description of the given historical event and the root cause of the historical event;

using the generative language model to generate multiple cause analysis paths ("CAPs") that connect the candidate root cause of the current event to the root causes of the set of relevant historical events;

scoring the multiple CAPs, respectively, producing intermediate scores; and setting the cause-based confidence score using the intermediate scores.

8. The one or more non-transitory computer-readable media of claim 7, wherein the using the generative language model to generate the multiple CAPs includes, for a given CAP of the multiple CAPs:

providing, to the generative language model, the candidate root cause of the current event, the root causes of the set of relevant historical events, and an instruction to analyze whether the set of relevant historical events validates the candidate root cause of the current event; and receiving, from the generative language model, the given CAP.

9. The one or more non-transitory computer-readable media of claim 8, wherein the set of relevant historical events validates the candidate root cause of the current event if the set of relevant historical events supports or suggests the candidate root cause of the current event.

10. The one or more non-transitory computer-readable media of claim 8, wherein the description of the current event is also provided to the generative language model along with an instruction to validate the candidate root cause in view of the description of the current event by:

verifying that the candidate root cause does not hallucinate information absent from the description of the current event; and/or verifying that the candidate root cause is not a simple summary of the description of the current event.

11. The one or more non-transitory computer-readable media of claim 7, wherein the scoring the multiple CAPs, respectively, includes, for a given CAP of the multiple CAPs, iteratively:

providing, to the generative language model, the candidate root cause of the current event, the root causes of the set of relevant historical events, the given CAP, and an instruction to score the candidate root cause of the current event; and receiving, from the generative language model, one of the intermediate scores for the given CAP.

12. The one or more non-transitory computer-readable media of claim 11, wherein the description of the current event is also provided to the generative language model, and wherein each of the intermediate scores for the given CAP depends on one or more of:

whether the set of relevant historical events validates the candidate root cause of the current event;

extent to which the candidate root cause does not hallucinate information absent from the description of the current event;

extent to which the candidate root cause is not a simple summary of the description of the current event; and extent to which the candidate root cause provides actionable guidance.

13. The one or more non-transitory computer-readable media of claim 1, wherein the using the confidence mapping model to determine the final confidence score comprises:

providing, as inputs to the confidence mapping model, the description-based confidence score and the cause-based confidence score; and receiving, as output from the confidence mapping model, the final confidence score.

14. The one or more non-transitory computer-readable media of claim 1, wherein the outputting the final confidence score comprises:

providing the final confidence score to another tool; or displaying the final confidence score along with the candidate root cause.

15. The one or more non-transitory computer-readable media of claim 1, wherein the current event is an incident or symptoms, and wherein the target domain is selected from the group consisting of root cause analysis for failures of mechanical systems, root cause analysis for medical conditions, root cause analysis for data center incidents, and root cause analysis for failures of customer devices.

16. A method performed in In a computer system, the method comprising:

for each of multiple validation events of a validation set as a current event:

receiving a description of the current event;

determining a candidate root cause of the current event using a generative language model and the description of the current event, wherein the candidate root cause of the current event is a textual response from the generative language model;

determining a description-based confidence score based at least in part on the description of the current event and based at least in part on descriptions of a set of relevant historical events in a target domain, wherein, for the set of relevant historical events, relevance depends on semantic similarity between the description of the current event and the descriptions of the set of relevant historical events, respectively; and determining a cause-based confidence score based at least in part on the candidate root cause of the current event and based at least in part on root causes of the set of relevant historical events; and calibrating a confidence mapping model according to an optimization objective based at least in part on the description-based confidence scores and the cause-based confidence scores for the multiple validation events, respectively.

17. The method of claim 16, wherein the optimization objective is:

minimization of score according to an expected calibration error metric; or minimization of score according to an error metric with bin-specific weights from a weighting function.

18. The method of claim 16, wherein bin thresholds separate bins of a confidence interval, and wherein the optimization objective:

uses uniform binning, such that the bin thresholds are uniformly spaced; or uses calibrated binning, such that the bin thresholds are adjusted according to the optimization objective.

19. The method of claim 16, wherein the calibrating the confidence mapping model is also based at least in part on labels for the multiple validation events, respectively, the method further comprising, before the calibrating the confidence mapping model, using the generative language model to determine the labels for the multiple validation events, respectively, including, for each of the multiple validation events:

determining a label score for a candidate root cause of the validation event compared to a ground-truth root cause of the validation event; and comparing the label score to a label score threshold.

20. A computer system comprising a processing system and memory, wherein the computer system implements a confidence estimation tool comprising:

a retrieval model configured to retrieve a set of relevant historical events in a target domain, wherein, to measure relevance, the retrieval model quantifies semantic similarity between a description of a current event and descriptions of available historical events, respectively;

a confidence estimator configured to:

receive the description of the current event;

determine a candidate root cause of the current event using a generative language model and the description of the current event, wherein the candidate root cause of the current event is a textual response from the generative language model;

determine a description-based confidence score based at least in part on the description of the current event and based at least in part on descriptions of the set of relevant historical events in the target domain; and determine a cause-based confidence score based at least in part on the candidate root cause of the current event and based at least in part on root causes of the set of relevant historical events, including assigning the cause-based confidence score based at least in part on whether the candidate root cause of the current event results from hallucination by the generative language model of features absent from the description of the current event; and a confidence mapping model configured to determine a final confidence score based at least in part on the description-based confidence score and the cause-based confidence score, and to output the final confidence score, wherein the final confidence score depends at least in part on a level of confidence that the candidate root cause of the current event avoids hallucination by the generative language model.

* * * * *